March 16, 1926.  
R. G. CLARK  
APPARATUS FOR MAKING BOXES  
Filed Oct. 10, 1923  
1,576,810  
18 Sheets-Sheet 11
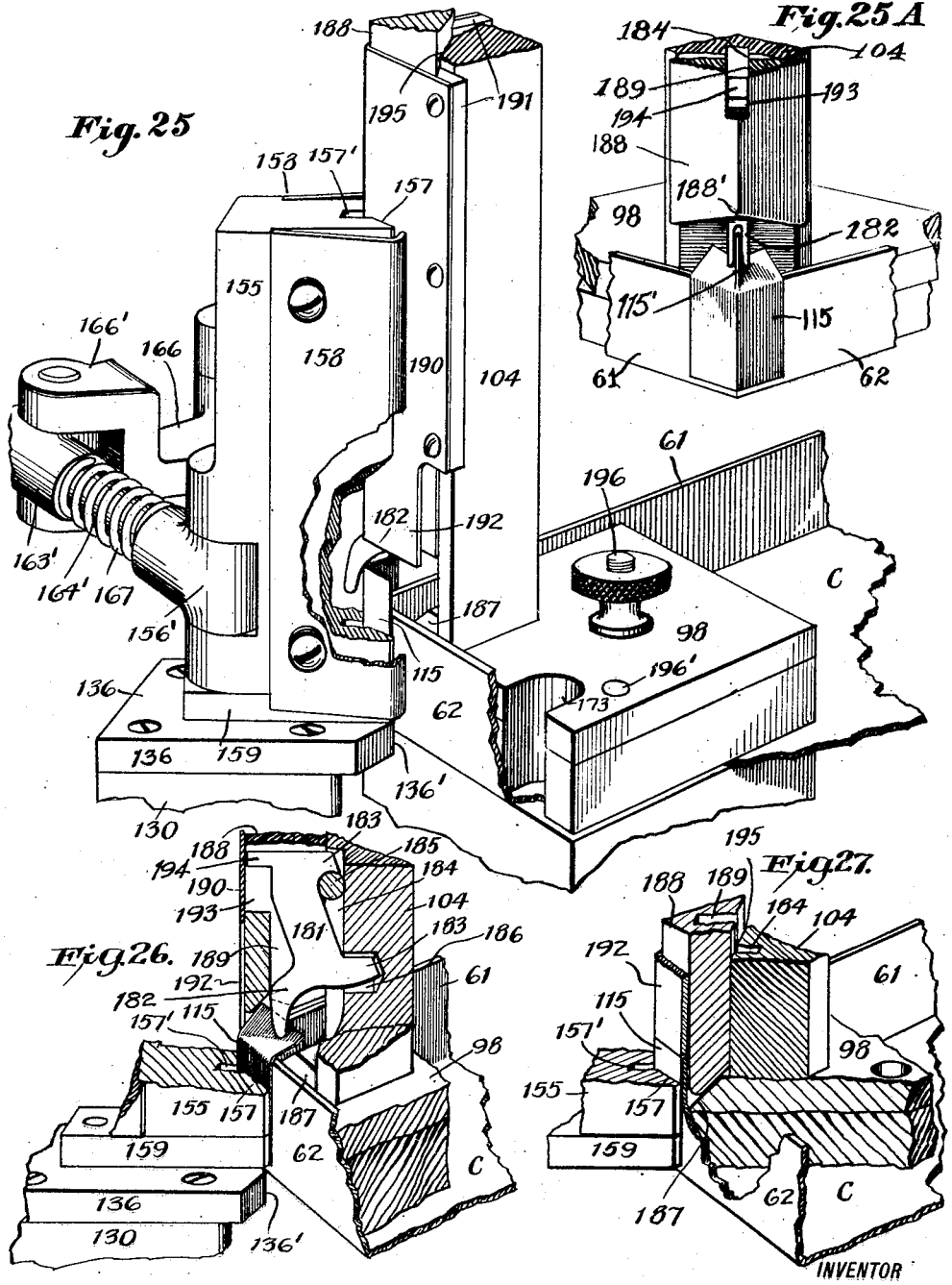

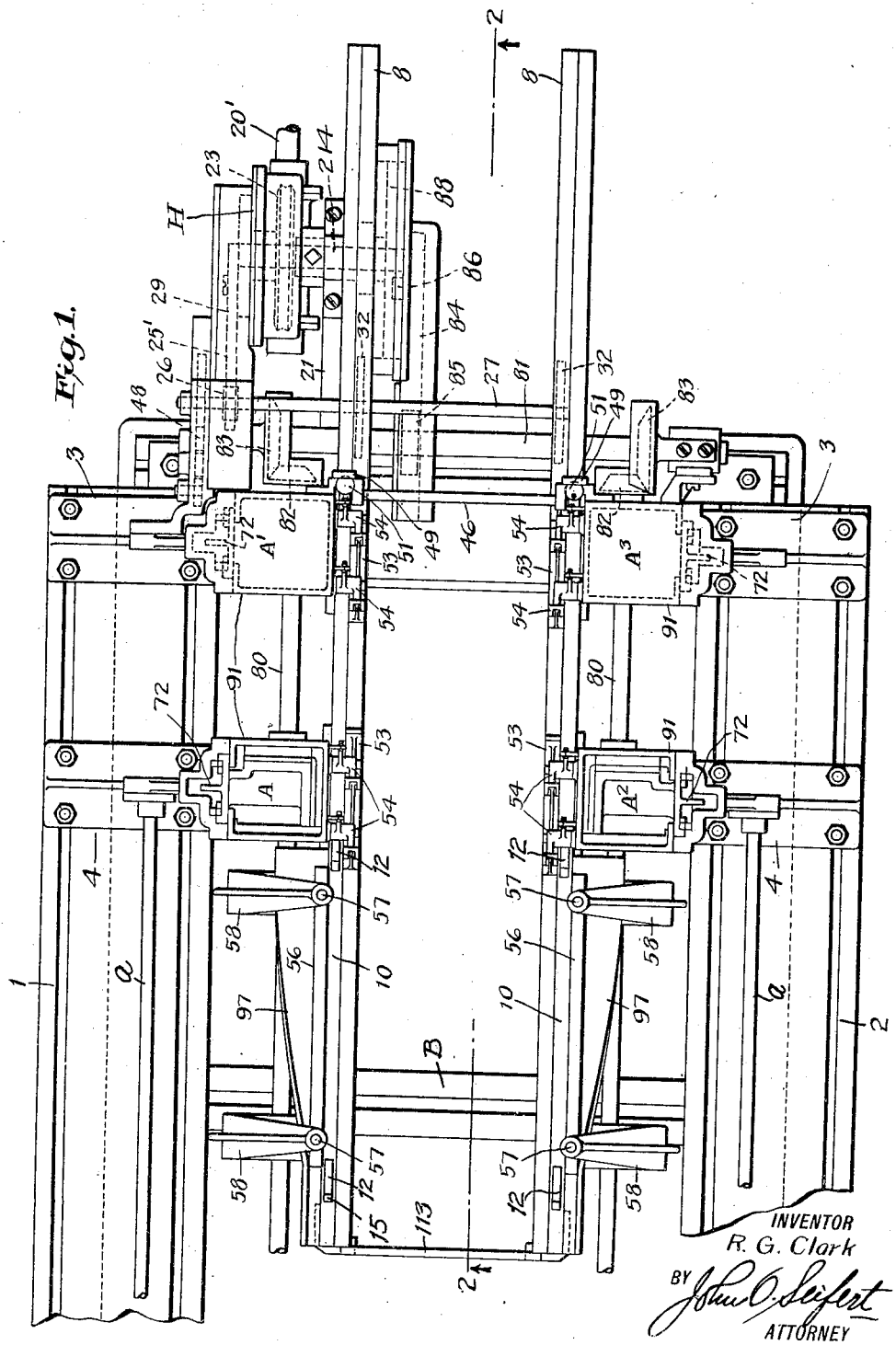

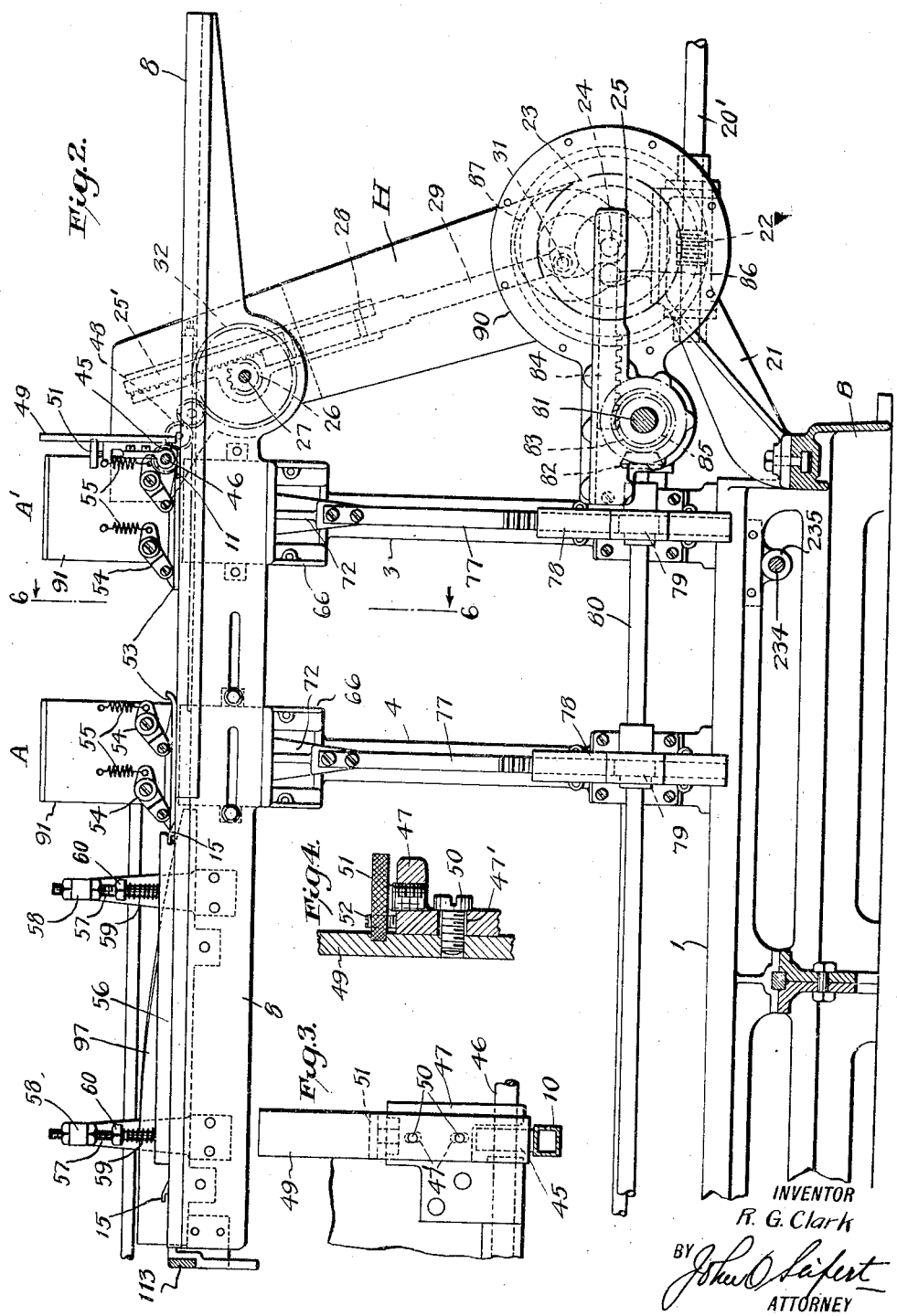

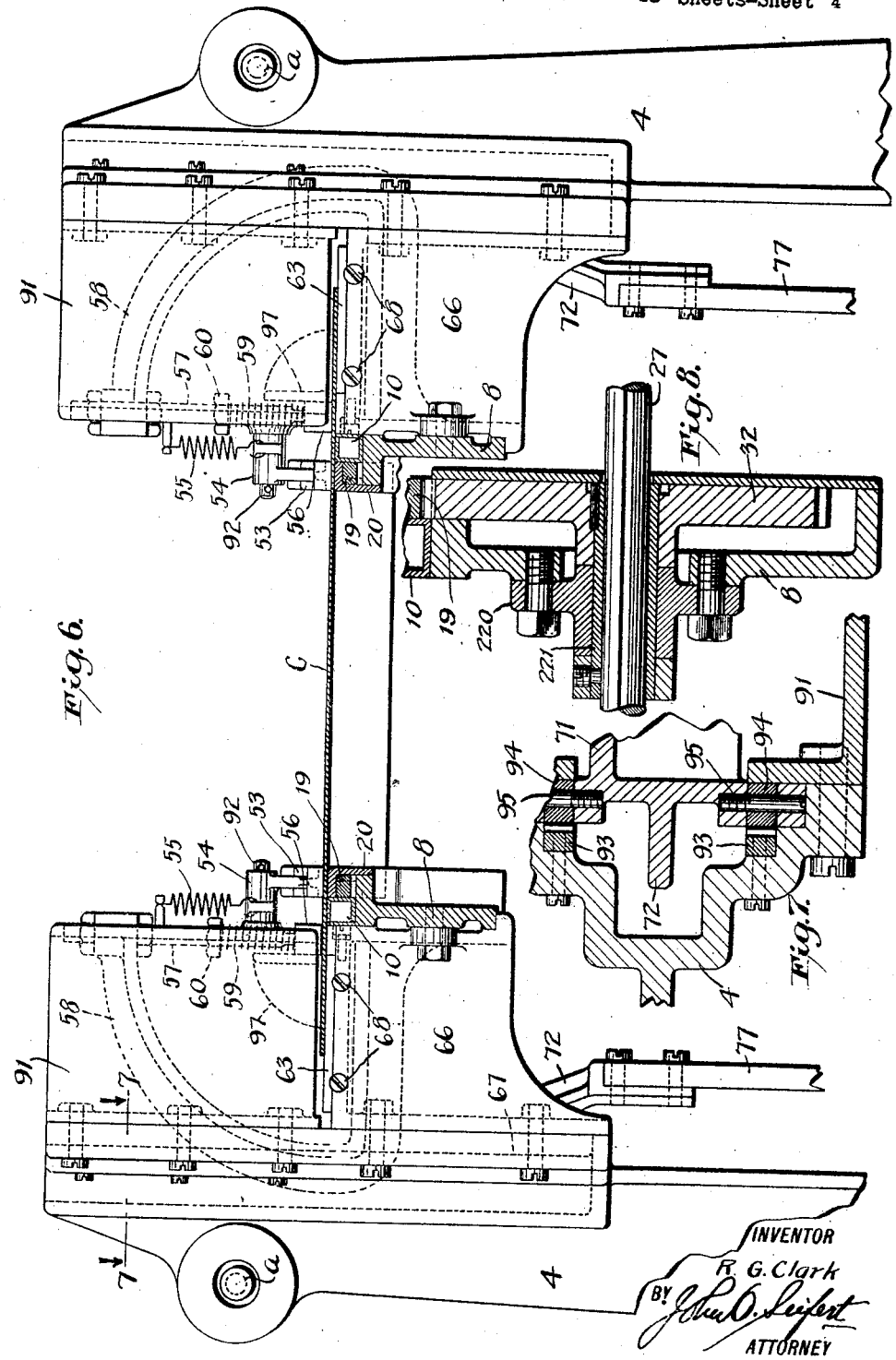

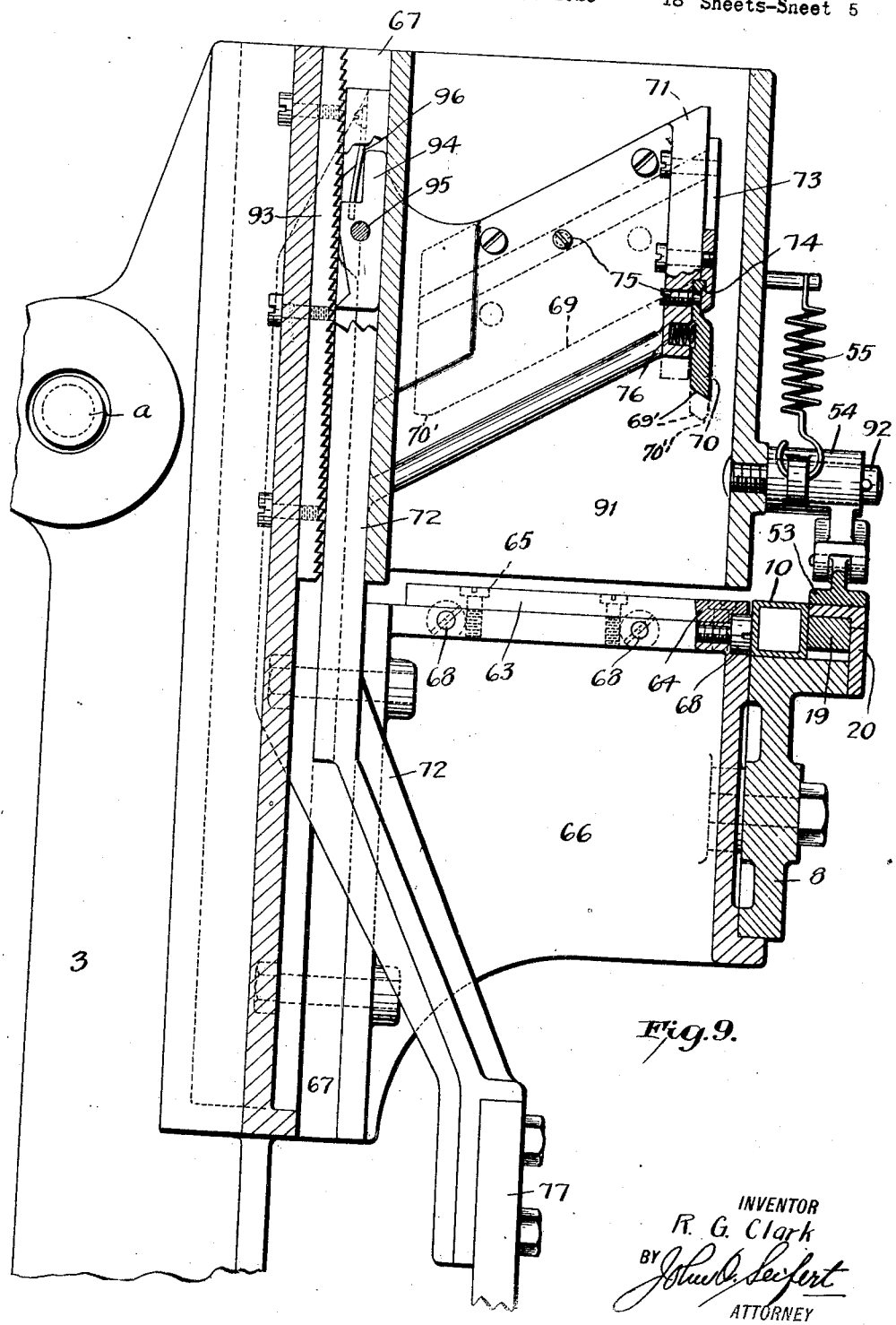

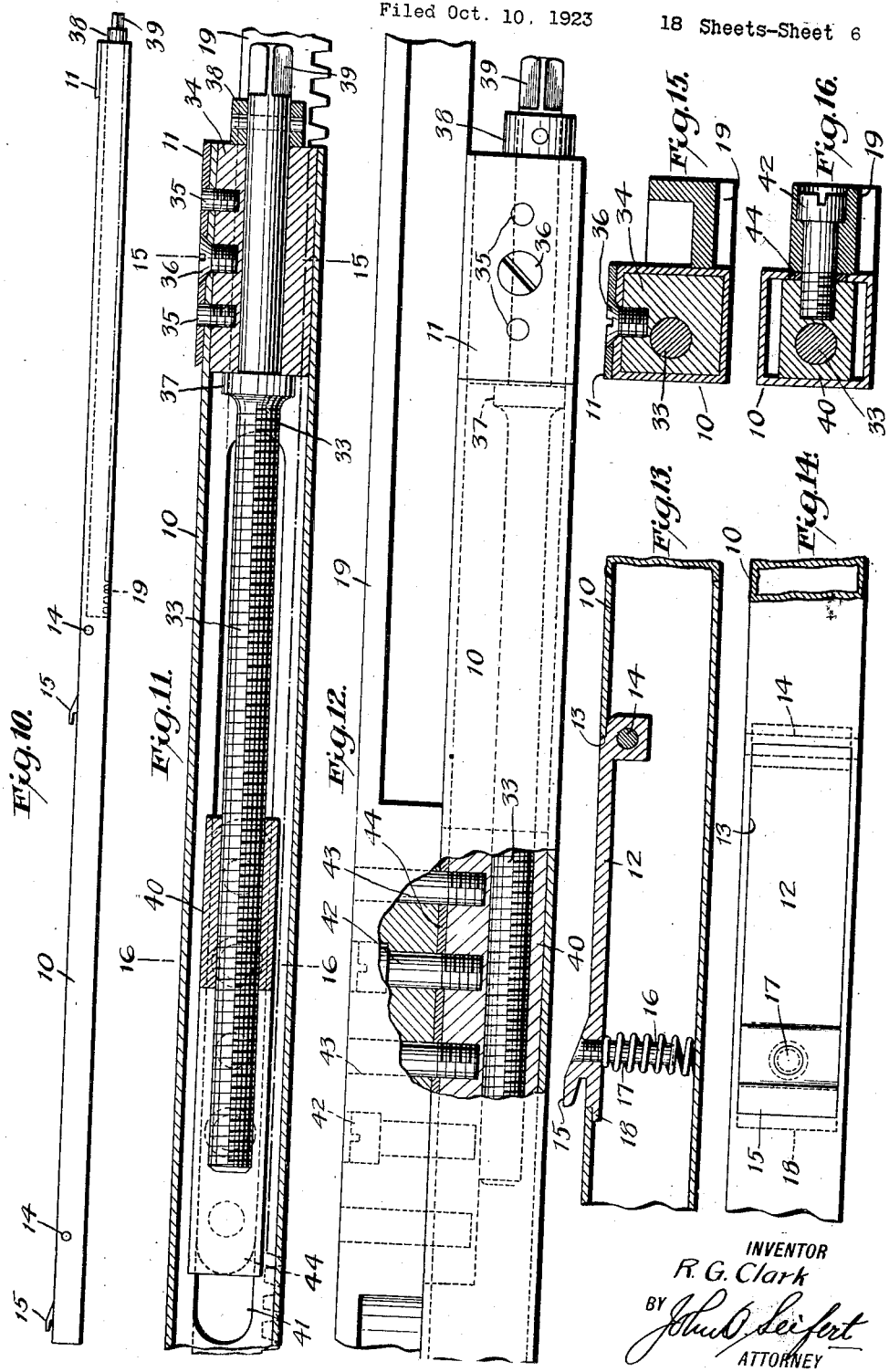

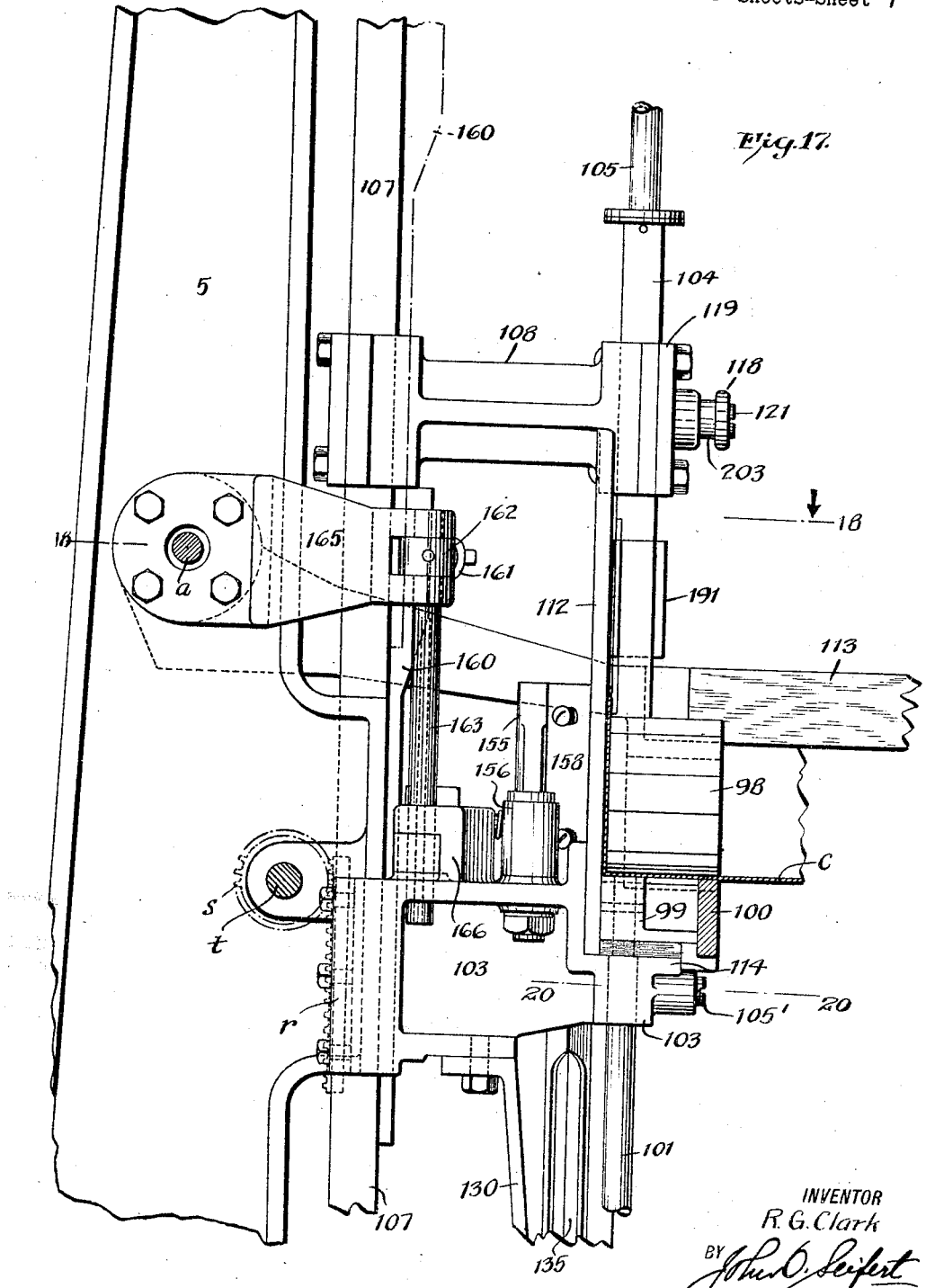

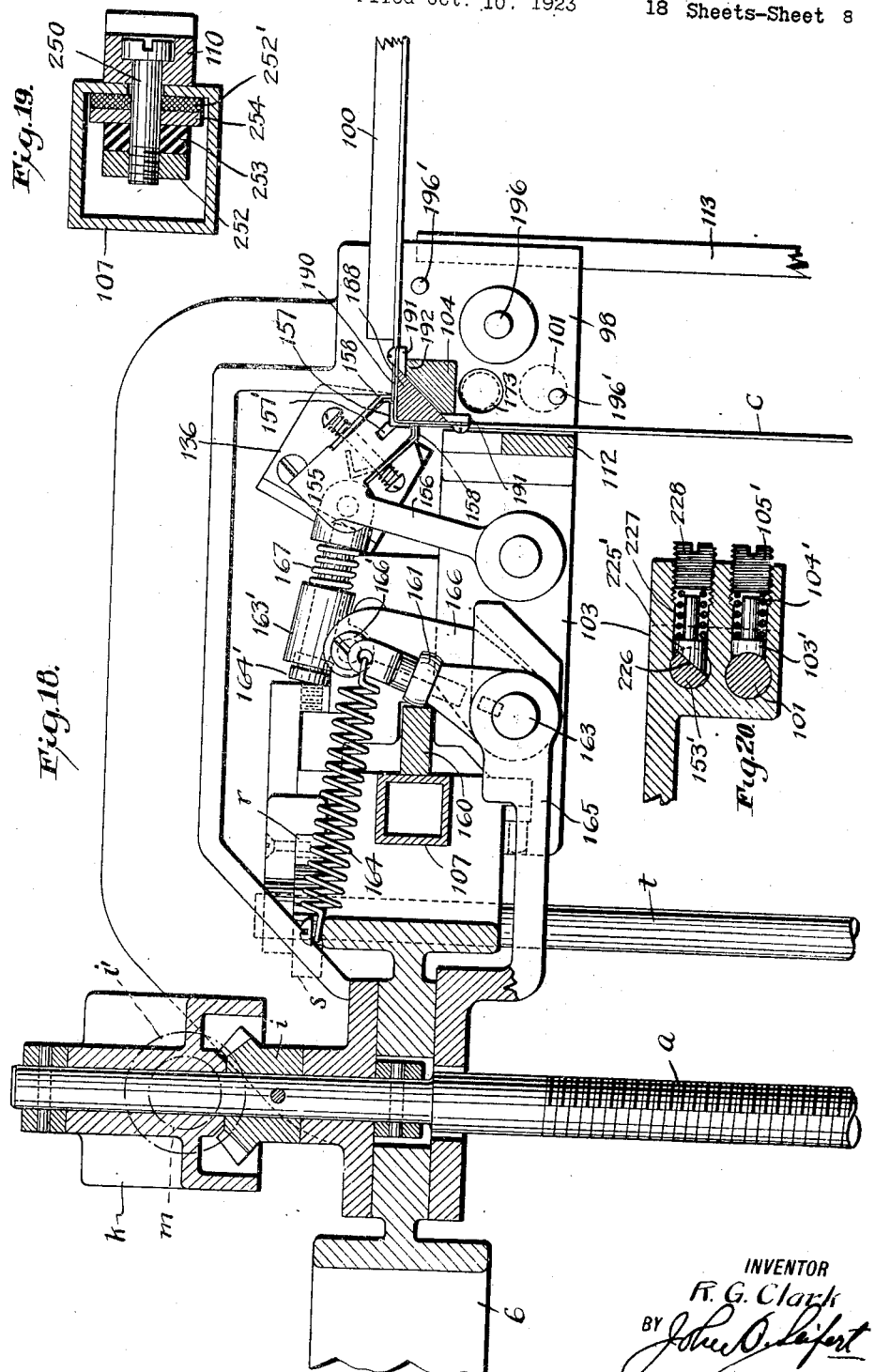

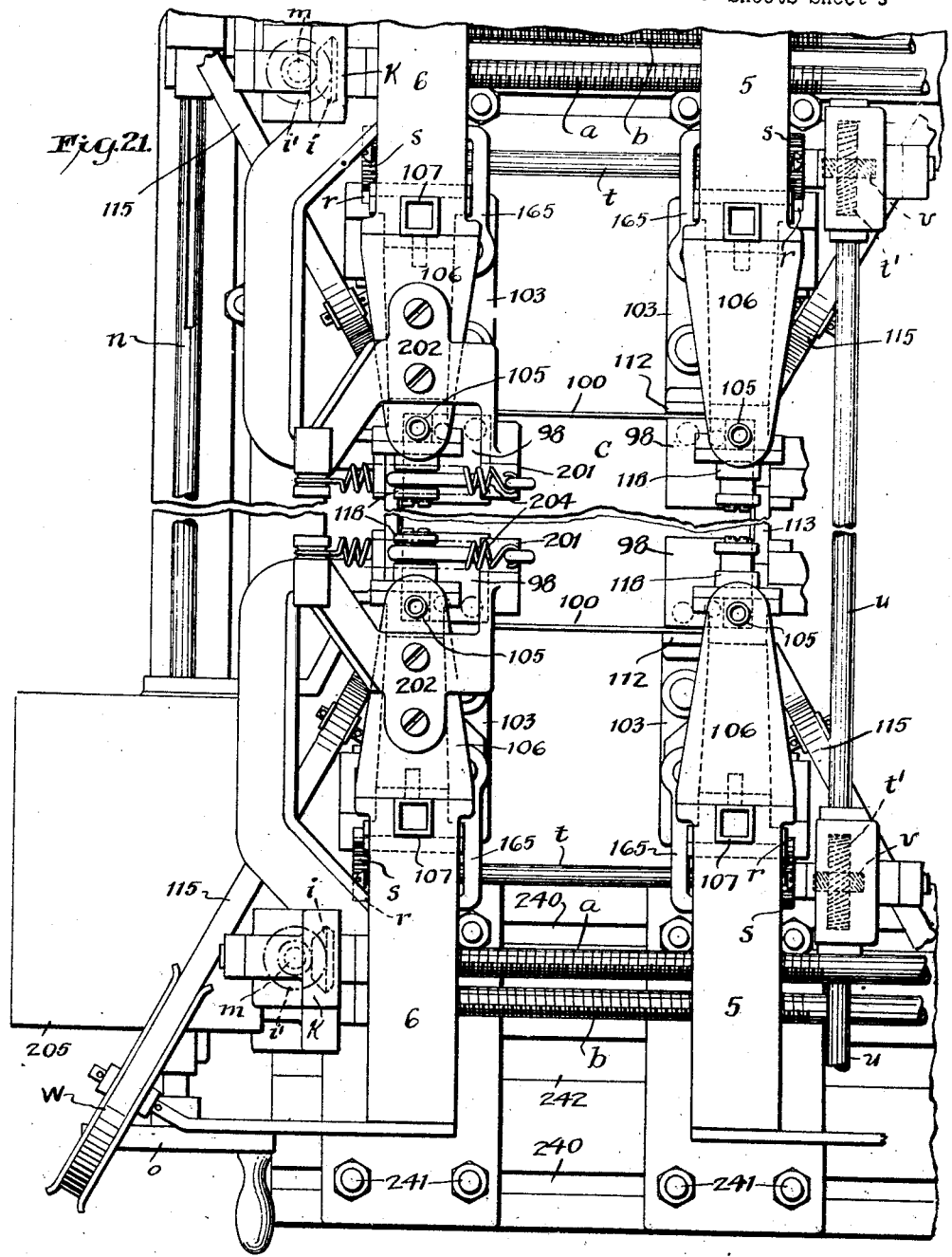

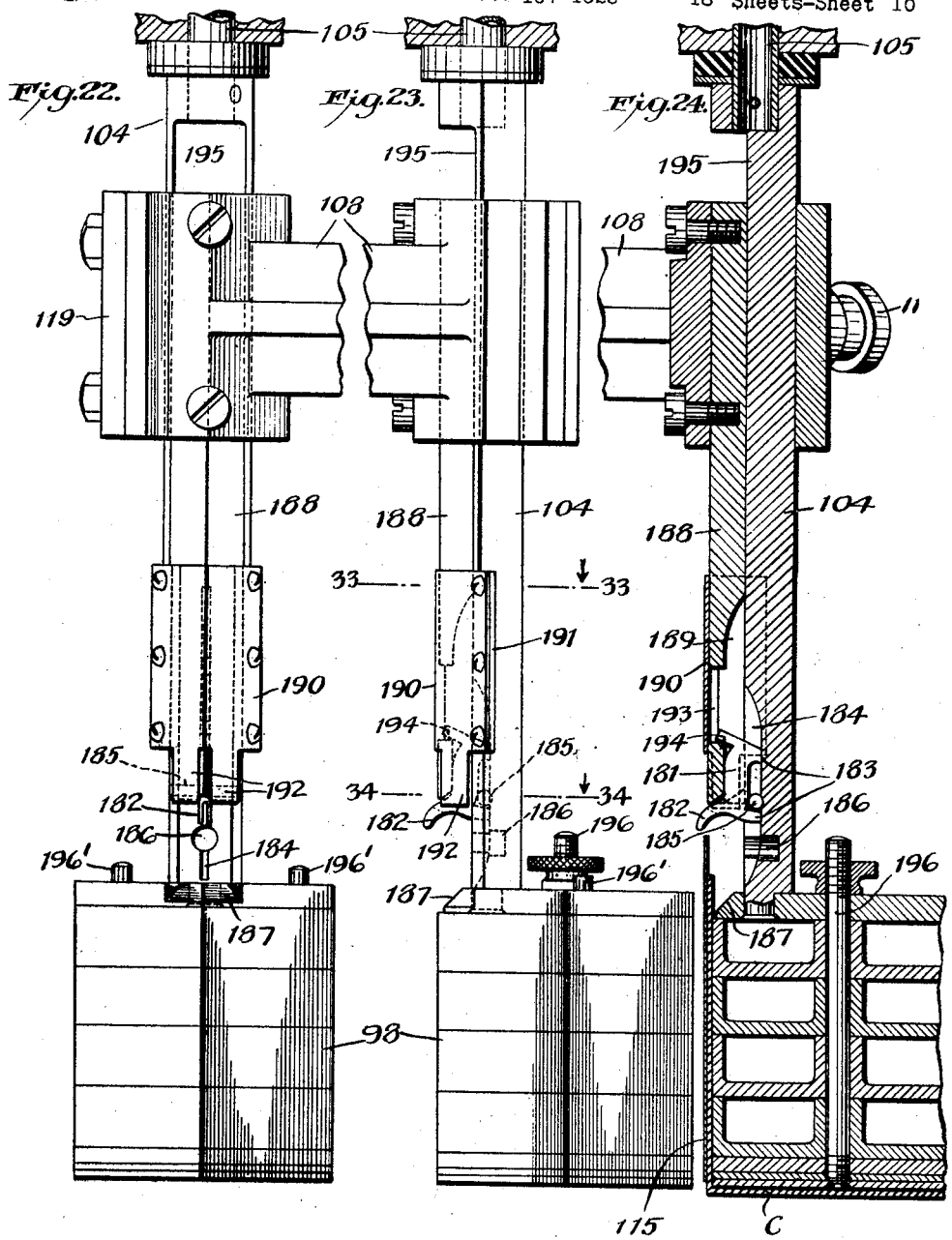

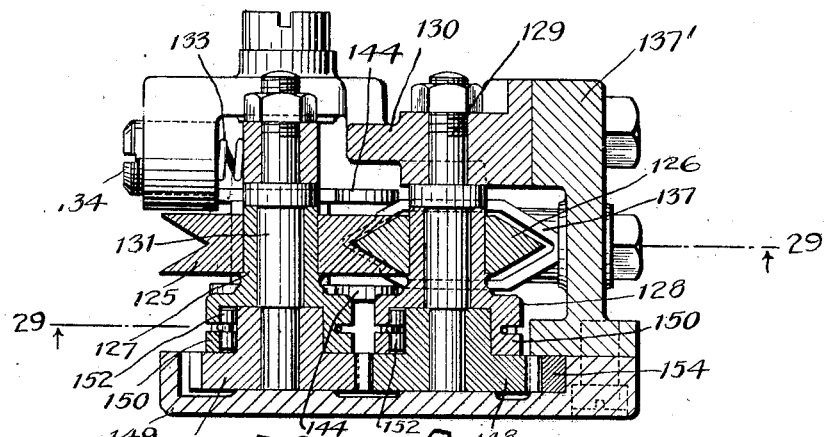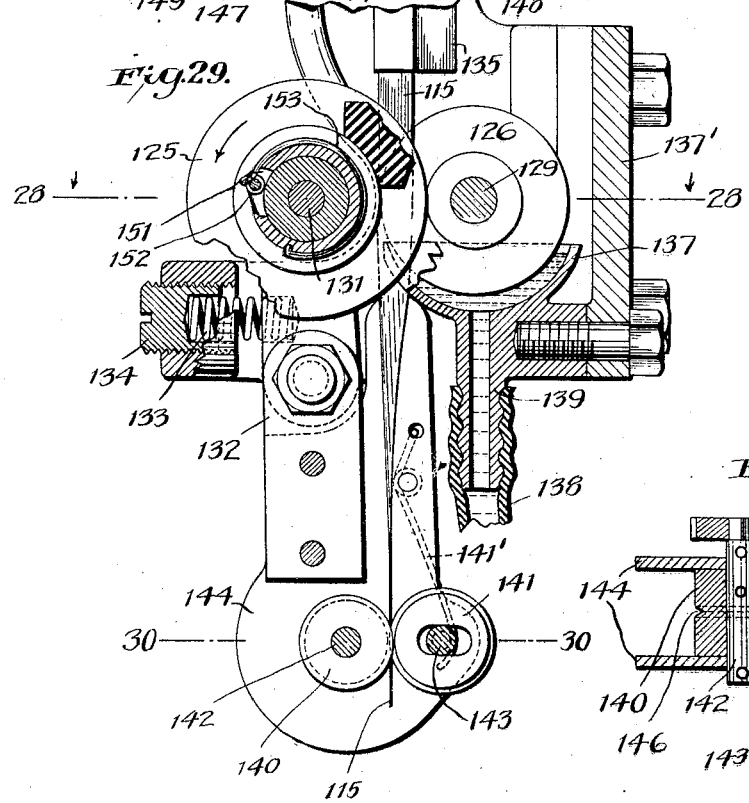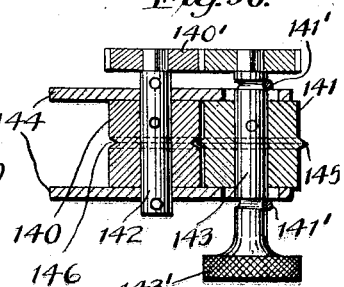

March 16, 1926.
R. G. CLARK
1,576,810
APPARATUS FOR MAKING BOXES
Filed Oct. 10, 1923   18 Sheets-Sheet 13
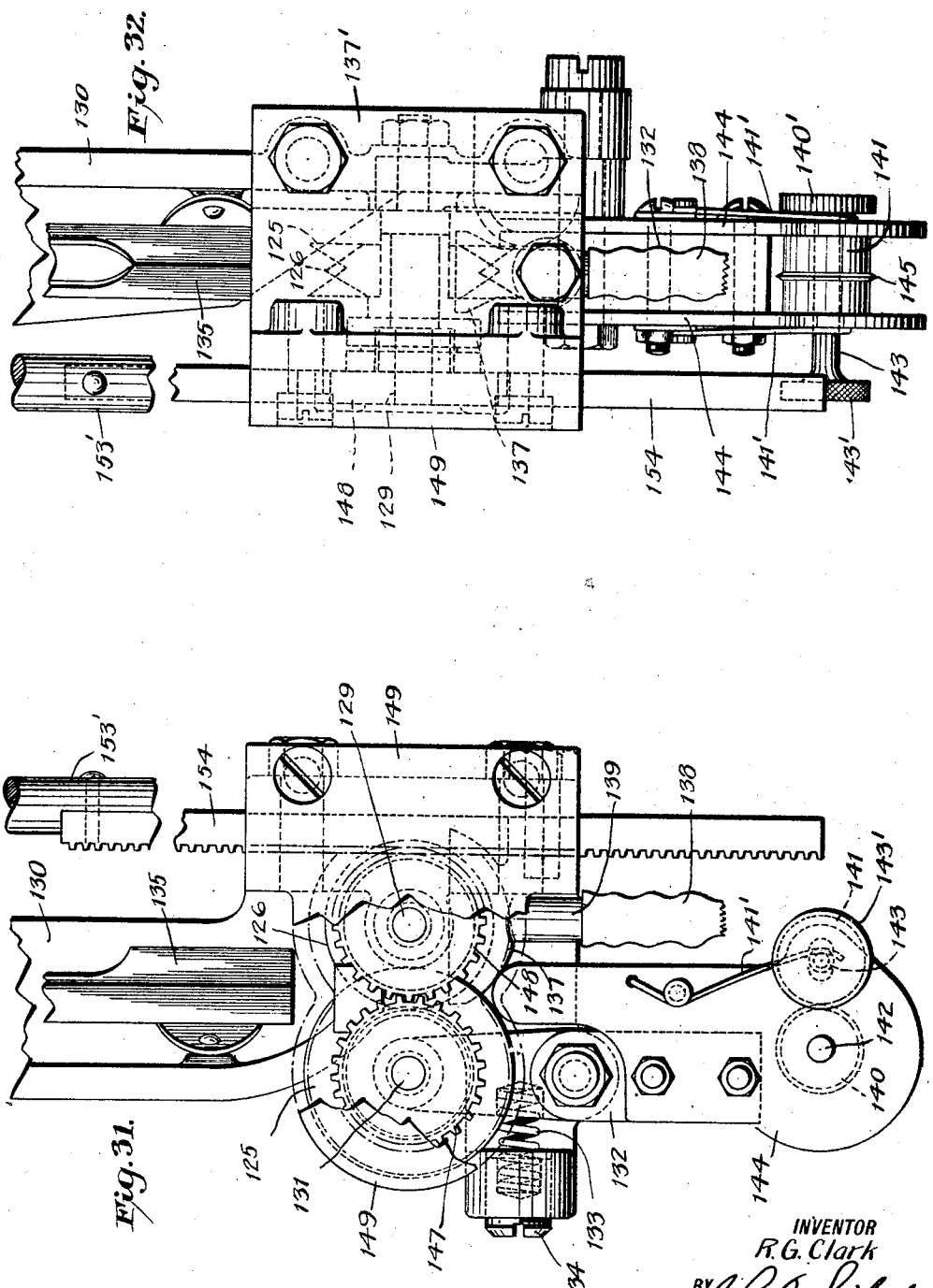

March 16, 1926. 1,576,810
R. G. CLARK
APPARATUS FOR MAKING BOXES
Filed Oct. 10, 1923 18 Sheets-Sheet 14
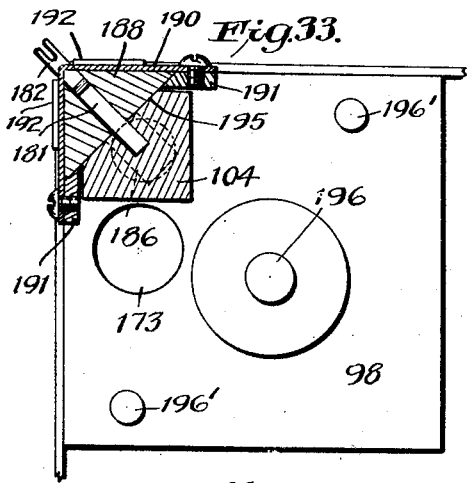
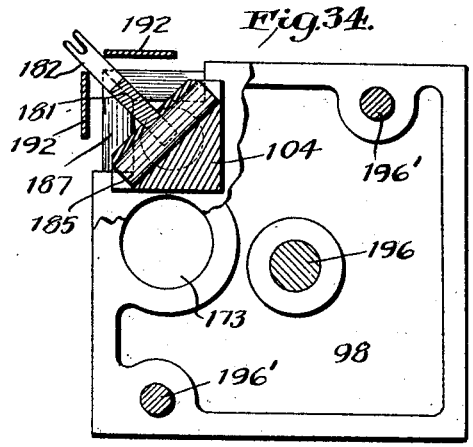
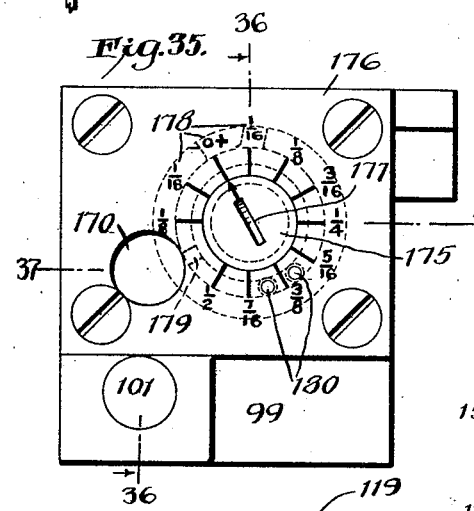
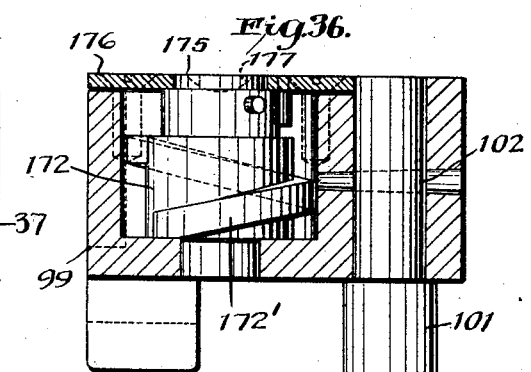
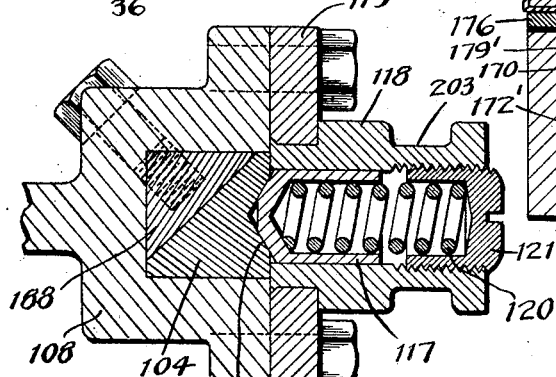
INVENTOR
R. G. Clark
BY
ATTORNEY March 16, 1926.  1,576,810
R. G. CLARK
APPARATUS FOR MAKING BOXES
Filed Oct. 10, 1923   18 Sheets-Sheet 15
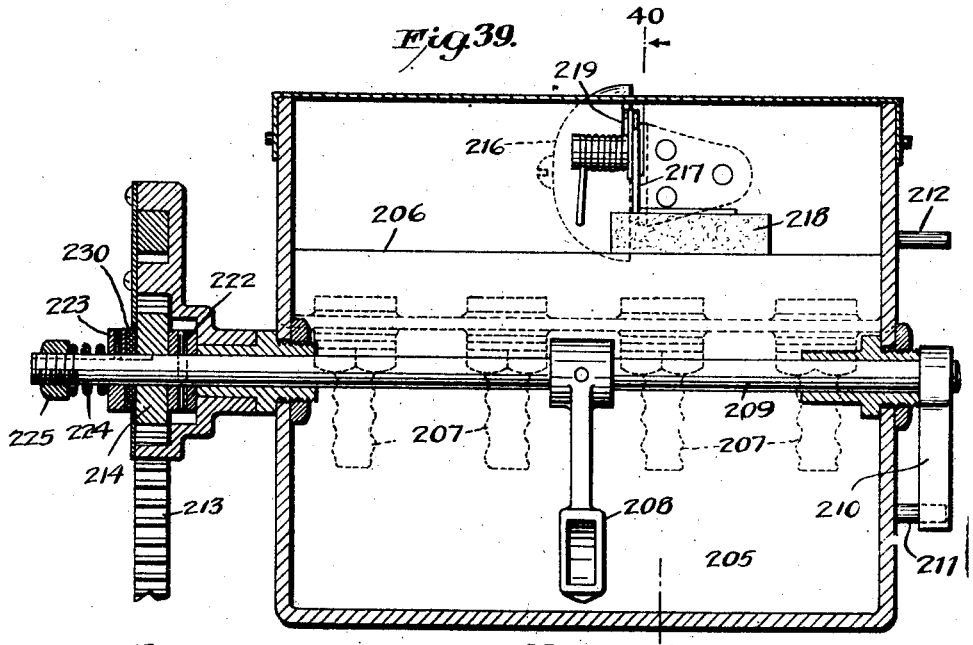
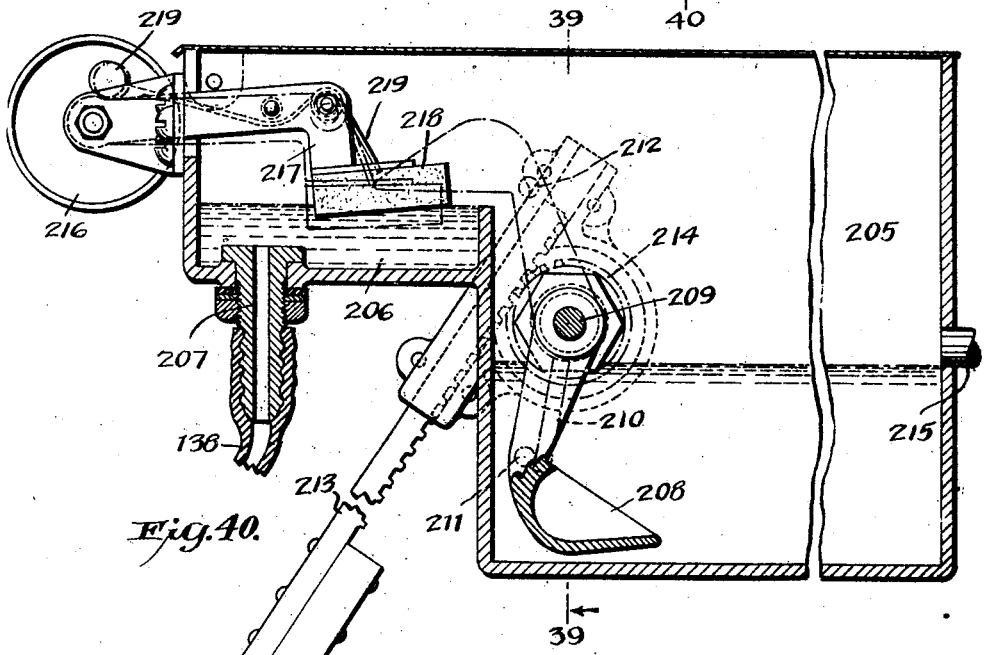
INVENTOR
R. G. Clark
BY
ATTORNEY March 16, 1926.  1,576,810
R. G. CLARK
APPARATUS FOR MAKING BOXES
Filed Oct. 10, 1923  18 Sheets-Sheet 16

INVENTOR
R. G. Clark
BY John O. Seifert
ATTORNEY

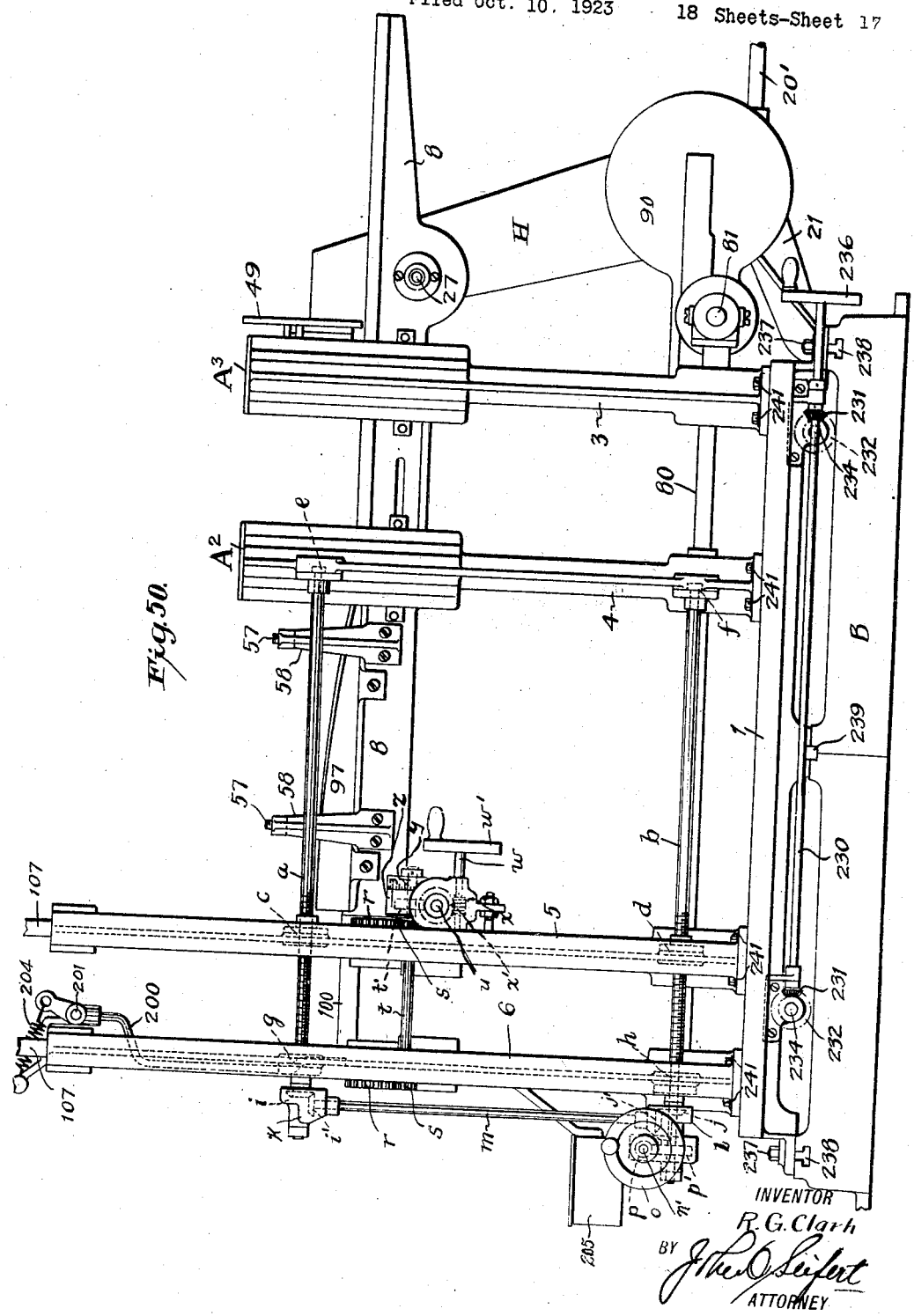

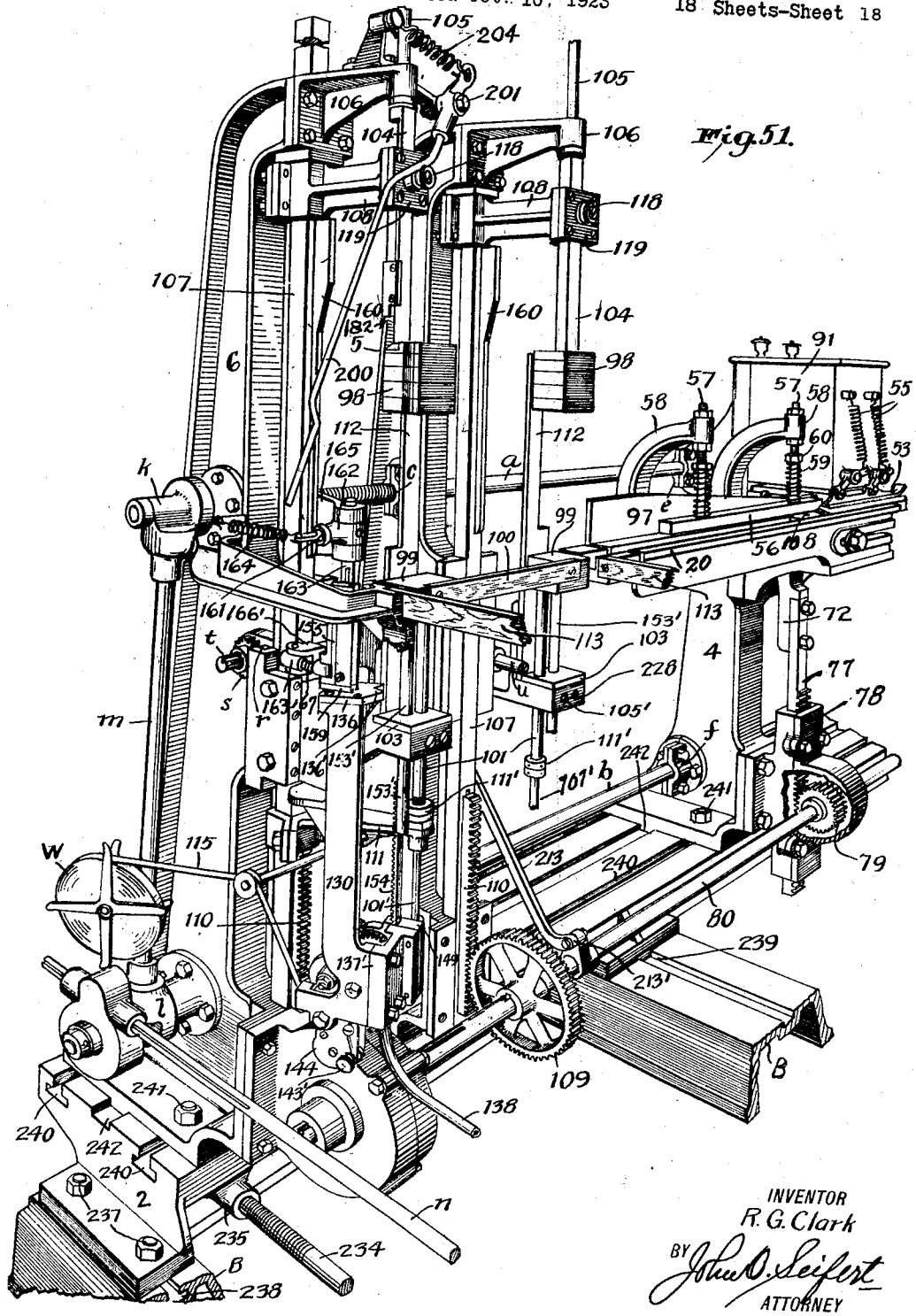

Patented Mar. 16, 1926.

1,576,810

UNITED STATES PATENT OFFICE.

ROBERT G. CLARK, OF BROOKLYN, NEW YORK, ASSIGNOR TO LIBERTY AUTOMATIC PAPER BOX MACHINE CORPORATION, OF BROOKLYN, NEW YORK, A CORPORATION OF NEW YORK.

APPARATUS FOR MAKING BOXES.

Application filed October 10, 1923. Serial No. 667,614.

*To all whom it may concern:*

Be it known that I, ROBERT G. CLARK, a citizen of the United States, and a resident of the borough of Brooklyn, in the county of Kings, city and State of New York, have invented certain new and useful Apparatus for Making Boxes, of which the following is a specification.

This invention relates to apparatus for making boxes of rectangular shape wherein a rectangular box blank is scored at a predetermined point within the edge portion, depending upon the depth of box to be made, and a rectangular portion cut from each corner of the blank on the lines of the scoring thereby arranging the blank with opposite side and end flap portions adapted to be bent or folded up on a line with the scoring at right angles to the body of the blank to constitute the sides and ends of the box, and the flaps secured in folded position by applying adhesive stay strips or tabs to the corners formed by the bent up flaps and thereby produce a box.

It is the principal object of the invention to provide improved apparatus for this purpose wherein box blank feeding means is intermittently and successively operative to feed the box blanks to cutter mechanism operative during the periods of rest of the feeding means to cut a portion from each corner of the blanks to arrange the blanks with opposite side and end flap portions; the feeding means being operative to deliver the cut blank from the cutter mechanism and during the delivery of such blank feeding a successive blank to the cutter mechanism, the opposite side flap portion of the blank as the blank is delivered from the cutter mechanism being bent or folded up substantially at right angles to the body portion of the blank and the blank in such condition delivered to means operative concomitantly with the successive operation of the cutter mechanism to cut the corners from the successive blank to bend or fold up the opposite end flap portions; to provide means to feed adhesive stay strip webs adjacent to the corners of the bent up blank flaps, sever a fed portion of the stay strips and apply the same to the corners of the bent up flaps of the blanks, and to retract said mechanisms simultaneously with the retracting movement of the cutter mechanism to act upon a successive blank delivered from the cutter mechanism; to provide means operative as the means to fold up the opposite end flap portions approaches its retracted position to eject the boxes from the apparatus, and to provide apparatus of this character which is simple and inexpensive in structure for the work it is to perform and highly efficient in use.

It is another object of the invention to provide apparatus of this character which is readily adjustable to adapt the same to make boxes of variable sizes and depth.

It is a further object of the invention to provide improved means to feed adhesive stay strip webs adjacent to the corners formed by the bent up blank flaps and apply the same to the outer side of the corners, to feed portions of the stay strip webs to extend variable lengths above the top edge of the folded blank flaps, and to provide improved means to turn in said extended stay strips, fold and firmly and forcibly set the same against the inner corners of the folded blank flaps.

It is a still further object of the invention to provide stay strip feeding means including means to longitudinally score the stay strip webs and construct and arrange the feeding means to simultaneously with the feeding of the webs longitudinally crease or fold the webs on such scoring to angular shape in cross section to fit the corners formed by the bent up blank flaps, and simultaneously with the feeding and creasing of the stay strip webs moisten a gummed surface thereof; provide means to at all times insure a supply of the moistening liquid, and to provide means to actuate a signal or alarm when there is an insufficient supply of the moistening medium.

A further object of the invention relates to improved adjustable blank feeding means whereby to feed blanks of variable sizes to a predetermined point.

Other objects and advantages will hereinafter appear.

In the drawings accompanying and forming a part of this specification there is shown an embodiment of the invention wherein Figure 1 is a plan view of one end portion of the apparatus to which the box blanks are fed and being arranged with cutter mechanism for cutting a portion from each corner of the box blanks, the means to feed the blanks to and deliver the same from the cutter mechanism together with the actuating means for said cutter mechanism and the blank feeding means, and also showing means to bend or fold up the opposite side flap portions of the blanks as they are delivered from the cutter mechanism.

Figure 2 is a view taken substantially through the center of Figure 1 looking in the direction of the arrows and showing the means to support the blanks in relation to the blank feeding and cutting mechanism and showing the blank feeding means in its advanced position.

Figure 3 is an enlarged detail view in front elevation of means arranged rearwardly of the cutter mechanism to cooperate with the feeding means to start a blank along the blank support as the blank is fed to the apparatus, and adjustable means for gauging and preventing the feeding of more than a single sheet.

Figure 4 is a detail view in cross section to show the manner of mounting and adjusting the blank gauging means.

Figure 6 is an enlarged cross sectional view to show the blank support and feeding means, the cutter mechanism for cutting a portion from the corners of the blank and showing a blank in relation thereto.

Figure 7 is a detail sectional view on an enlarged scale taken substantially on the line 7—7 of Figure 6 looking in the direction of the arrows to show the mounting of a reciprocable carrier for cutter blades of the cutter mechanism.

Figure 8 is a detail sectional view on an enlarged scale to show the means for mounting the blank support and the actuating gear for the blank feeding means to permit of adjustment of the same to make boxes of variable sizes.

Figure 9 is an enlarged sectional view of a cutter mechanism for cutting the corners from a blank showing the same in relation to the blank feeding means and the support therefor.

Figure 10 is a side elevation of a feed bar constituting a part of the blank feeding means.

Figure 11 is an enlarged longitudinal sectional side view of a part of the bar shown in Figure 10 and showing means to adjustably connect the bar relative to an actuating rack therefor to adapt the same to feed blanks of variable sizes.

Figure 12 is a view, partly in section, looking at the top of Figure 11.

Figure 13 is an enlarged longitudinal sectional view of a portion of a feed bar to show the arrangement of mounting a blank engaging and feeding finger thereon.

Figure 14 is a view looking at the top of Figure 13.

Figure 15 is a cross sectional view taken on the line 15—15 of Figure 11.

Figure 16 is a cross sectional view taken on the line 16—16 of Figure 11.

Figure 17 is an elevational view of a portion of the means to bend or fold up the opposite end flaps of the box blank, retain said end flap portions and the side flap portions in folded condition to apply an adhesive stay strip to the corners of the bent up blank flaps together with said stay strip applying means, and the actuating means therefor showing the parts in stay strip applying position.

Figure 18 is a sectional plan view taken substantially on the line 18—18 of Figure 17 of the stay strip applying means and showing the parts in position in applying a stay strip to a corner of the bent up blank flaps and means to adjust said mechanism to adapt the same to the making of boxes of variable sizes.

Figure 19 is a cross sectional view on an enlarged scale to show the connection of an actuating rack to one of the carriers and actuators for the end flap bending means of the blank and the stay strip applying means.

Figure 20 is a cross sectional plan view taken substantially on the line 20—20 of Figure 17 looking upward showing means to yieldingly retain the elevator means in variable positions.

Figure 5:
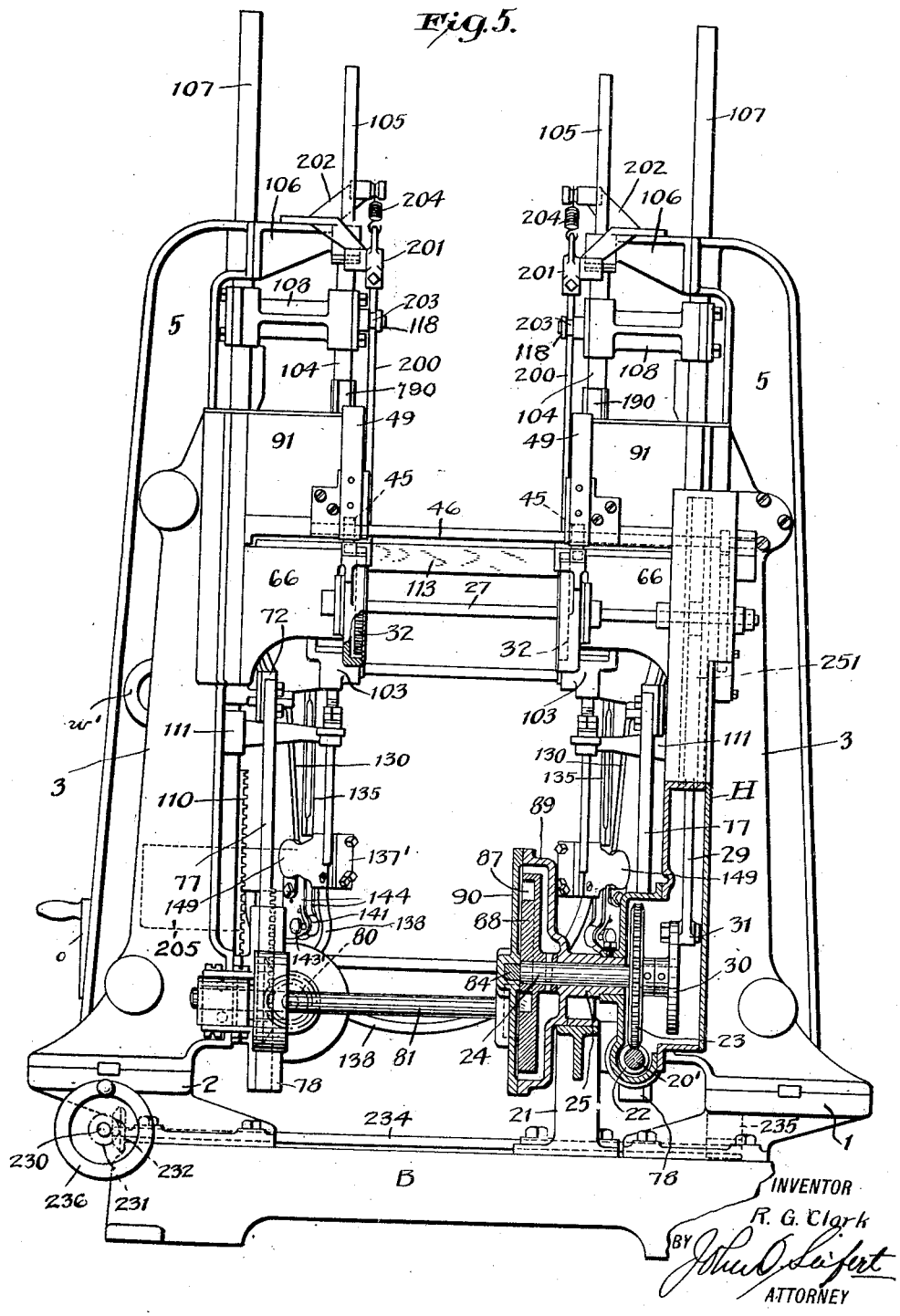
Figure 5 is an end view looking at the right of Figure 1, partly in section, to illustrate the arrangement of the driving means for the blank feeding mechanism, the cutter mechanism and the stay strip applying means.

Figure 21 is a plan view on an enlarged scale of the forward part of the apparatus to show the arrangement of the means to bend or fold up the end flaps of the blank, the stay strip feeding and applying means, the actuating means for said blank bending means and stay strip mechanism, means to eject a box after the stay strips have been applied thereto, and means to adjust said mechanism to adapt the same to make boxes of variable sizes.

Figure 22 is a front elevation, Figure 23 a side elevation, and Figure 24 a longitudinal sectional view on an enlarged scale of a portion of the means to bend or fold up the end flap portions of the blank and showing in connection therewith one of the mechanisms for turning in, folding and setting a stay strip against the inner surface of a corner portion of the bent up flaps.

Figure 25 is a perspective view on an enlarged scale and partly in section of a corner portion of the means to bend up the end flaps of the blank with the means to apply a stay strip thereto, together with means to turn in an extended portion of the stay strip over the top edge of the flap portion, said latter means being in position at the commencement of the turning in movement thereof.

Figure 25ᴬ is a perspective view looking at the front thereof of the means shown in Figure 25 to turn in the extended portion of the stay strip over the top edge of the blank flaps and showing the same in position with the stay strip turned in.

Figure 26 is a perspective view, in section, looking at the side thereof of the means shown in Figure 25ᴬ to turn in the extended portion of a stay strip over the top edge of the blank flaps and showing the parts substantially in the same position.

Figure 27 is a perspective view on an enlarged scale and in section of the means to fold the turned in and extended portion of the stay strip against the inner surface of the corner portion of the blank flaps.

Figure 28 is a cross sectional view taken substantially on the line 28—28 of Figure 29 of the means for feeding and creasing the corner stay strips.

Figure 29 is a side view, partly in elevation and partly in section, of the stay strip feeding and creasing means, means to moisten a gummed surface of the stay strip web as it is creased and fed, and means to longitudinally score the stay strip webbing, taken on the line 29—29 of Figure 28 looking in the direction of the arrows.

Figure 30 is a sectional view of the stay strip web scoring means taken on the line 30—30 of Figure 29.

Figure 31 is a side elevation, on an enlarged scale and partly broken away, of the means for actuating the stay strip web feeding, creasing and moistening means shown in Figures 28 and 29.

Figure 32 is a front elevation looking at the right of Figure 31.

Figures 33 and 34 are cross sectional views, on an enlarged scale, taken on the lines 33—33 and 34—34 of Figure 23 to show the stay strip turning, folding and setting means in relation to a part of the plunger means of the end flap bending means.

Figure 35 is a plan view of a corner portion of elevator means forming a part of the end flap bending means for adjustably carrrying an actuator for a stay strip web feeding means and showing an index in relation thereto for indicating adjustment of the web feeding means to feed different lengths of the stay strips.

Figure 36 is a sectional view taken on the line 36—36 of Figure 35 looking in the direction of the arrows.

Figure 37 is a sectional view taken on the line 37—37 of Figure 35 looking in the direction of the arrows, and showing part of the plunger means in relation thereto with an interposed box blank.

Figure 38 is a sectional view, on an enlarged scale, of means for releasably connecting the end flap bending means to its actuating means.

Figure 39 is a sectional view of a storage tank or reservoir for moistening liquid for the gummed surface of the stay strip webs with means for applying the liquid in said reservoir to a trough therein in communication with troughs in which a feeding roller of the stay strip feeding means engages for maintaining the liquid level in said latter troughs at a predetermined level, and the actuating means therefor, the section being taken on the line 39—39 of Figure 40.

Figure 40 is a cross sectional view taken on the line 40—40 of Figure 39 looking in the direction of the arrows.

Figure 41:
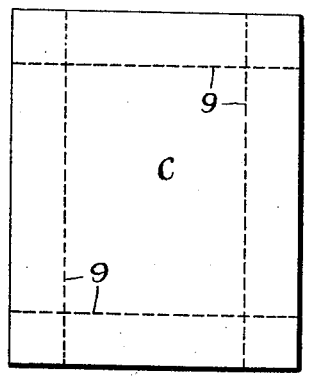

Figure 41 is a plan view of a scored blank to be acted upon and formed into a box by the apparatus.

Figure 42:
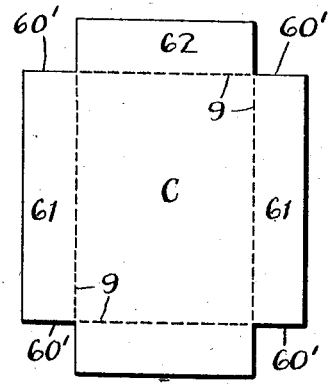

Figure 42 is a view of the blank showing the same after it has been presented to the cutting mechanisms and the corners cut therefrom to arrange the blank with end and side flap portions.

Figure 43:
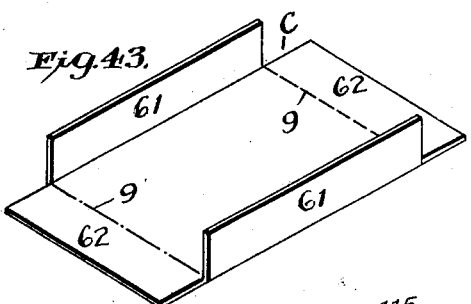

Figure 43 is a perspective view showing the condition of the blank after the same has been presented to the side flap bending means.

Figure 44:
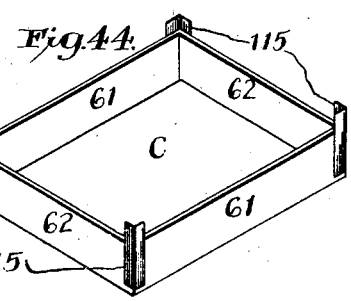

Figure 44 is a perspective view of the blank after the side and end flaps have been bent up and stay strips applied to the corners thereof showing the stay strips of a length to extend beyond the upper edge of the flaps to be turned in, folded and set against the inner surface of the corners of the flaps.

Figure 45:
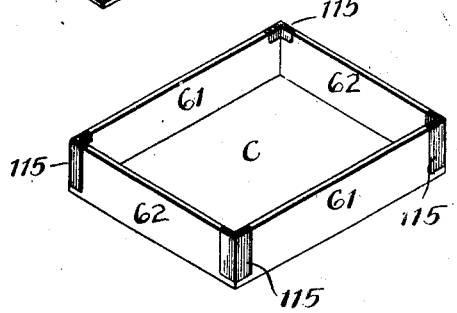

Figure 45 is a perspective view of a box with a portion of the corner stay strips folded and set against the inner surface of the corners of the flaps.

Figures 46 to 49, inclusive, are elevational views to show in a diagrammatic manner variable lengths of said strips adapted to be fed by the stay strip feeding means.

Figure 50 is a side elevation of the framework upon which the operative parts of the apparatus are mounted and showing in connection therewith means for adjusting the framework to adapt the apparatus for the making of boxes of different sizes; and Figure 51 is a sectional view, in perspective, of the front end portion of the apparatus taken substantially through the center thereof and looking at the inner side illustrating a part of the end flap bending means and its actuating means together with the arrangement of one of the stay strip feeding means and the manner of adjustably mounting the latter to adapt the same to the making of boxes of different depths.

Similar characters of reference designate like parts throughout the different views of the drawings.

In the embodiment of the invention shown in the drawings the operative mechanism is mounted upon a framework including a base B on which is mounted sub-bases 1 and 2 to have adjustment transversely of the base B toward and away from each other, on which sub-bases are mounted two pairs of columns of standards 3, 3 and 4, 4, one pair of columns 3, 4 being in opposed relation to the other pair of columns 3, 4 with the columns 4, 4 mounted on the sub-bases 1 and 2 to have adjustment toward and away from the columns 3, 3. Mounted on the sub-bases 1 and 2 forwardly of the columns 3 and 4 are two further pairs of columns 5, 5 and 6, 6 with one pair of columns 5, 6 in opposed relation to the other pair of columns 5, 6 and adjustable with the sub-bases toward and away from each other, the columns 6, 6 having adjustment on the sub-bases toward and away from the columns 5, 5. Each of the columns 3, 4 also carry supporting means along which the box blanks are intermittently and successively fed, said blank supporting means comprising a pair of parallel rails 8, 8 one rail being mounted upon a pair of columns 3, 4 and the other rail on the other pair of columns 3, 4, with one end of the rails extending beyond the columns 3, 3, as clearly shown in Figure 1, on which to receive the box blanks and from which extended portions of the support the blanks are taken up by feeding means. The blank C previously scored, as at 9, (Figure 41) is manually delivered to the extended end of the blank supporting rails 8, or they may be automatically delivered thereto from apparatus for scoring the blanks.

The blanks are successively picked up and intermittently fed along the blank support by blank feeding mechanism comprising a pair of reciprocable tubular bars 10 of rectangular shape in cross section (Figures 10 to 16) slidably engaging upon rails 8, each of which bars has a plate 11 fixed to the upper surface adjacent one end to constitute a fixed finger or dog to engage the rear edge of a box blank C and advance the blank along the blank support. To successively and intermittently advance the blanks fingers engaging and feeding the blanks are mounted upon the bars in spaced relation forwardly of the fixed fingers or dogs 11. These fingers are in the form of plates 12 mounted at one end in openings 13 in the upper surface of the bars on pivotal pins 14 extending transversely of the bars to have movement on horizontal axes and in a vertical direction, the opposite or forward ends of the plates being arranged with notches or recessed dogs or fingers 15 for the engagement of the rear edge of the blanks. The blank feeding finger carrying plates 12 are normally urged outward from the tubes by springs 16 coiled about studs 17 fixed in the plates and extending transversely of and into the tube bars, and the plates maintained in position substantially flush with the upper surface of the bars by lugs 18 engaging with the wall of the opening in the tube. By this arrangement during the retractive movement of the feeding bars the fingers 15 will engage beneath the blank during such movement, the outer surface of the fingers 15 being bevelled to facilitate this movement, and as the fingers move beneath the blanks the finger carrying plates 12 will be moved into the bars and thereby eliminate the possibility of the marring of the blank by the engagement of the fingers therewith as the feed bars are retracted. As the fingers move out from under the blank they will be moved upwardly by the springs 16 in position to engage a blank advanced by the dogs 11 by the previous forward movement of the bars and during the next forward movement of the bars engage said blank and feed it a successive increment of movement. The finger carrying bars 10 are connected to and reciprocated by racks 19 slidably engaging the top of the rails 8 at the inner sides of the bars 10 and engaging below guide bars 20 of angle shape in cross section secured to the rails 8 and which guide bars in conjunction with the finger carrying bars 10 constitute the support proper for the blank. (Figure 6.)

The racks 19 and finger carrying bars 10 are reciprocated and operatively connected to a source of power by a shaft 20' journaled in a bracket 21, said shaft having a worm 22 thereon meshing with a worm wheel 23 on a drive shaft 24 journaled in a pillow block 25 fixed on the bracket 21. A rack 25' meshes with a gear 26 on a transverse shaft 27 journaled in the rails 8, said rack having a flexible connection 28 with a rod 29 pivotally connected to a disk 30 fixed to the drive shaft 24 eccentric to the axis of said shaft, as shown at 31 (Figures 2 and 5). The racks 19 mesh with and are actuated by gears 32 on the shaft 27. The rack 25', rod 29 and the driving gearing 22, 23 therefore is enclosed in a housing H. It will be obvious that as the shaft 24 is rotated due to the eccentric connection 31 of the rack 25' with said shaft that a to and fro rotary movement will be imparted to the shaft 27 carrying the gears 32 and the racks connected to the feed bars reciprocated by the engagement of said racks with the gears 32.

To adjust the feed bars 10 relative to the racks 19 to adapt the same for feeding blanks of variable sizes there is an adjustable connection between the racks and feed bars, shown as comprising screws 33 rotatably mounted in blocks 34 within the bars, said blocks being secured in position by dowel pins 35 and a screw 36, the latter also serving to secure the dogs 11 to the bars. The screws 33 are held against longitudinal movement in the blocks by a shoulder 37 on the screws engaging at one end of the blocks and a collar 38 pinned to the screws at the opposite ends of the blocks. The ends of the screws 33 are arranged as at 39 for the application of means, such as a socket wrench or crank, to rotate the same. The racks are connected to the screws and the bars by blocks 40 slidably mounted in the bars, which are in the nature of nuts having screw threaded connection with the screws 33, and the racks connected to said blocks through slots 41 in the side wall of the bars by screws 42 and dowel pins 43 engaging in openings in the racks and threaded into the blocks, said dowel pins and screws also passing through a guide plate 44 slidably engaging in the bar slots. It will be obvious that as the screws 33 are rotated the finger carrying bars will be adjusted longitudinally of the racks.

To direct the leading edge of the blanks as they are delivered to the blank support and the blank feeding means rollers 45 of yielding material are mounted upon a shaft 46 journaled in brackets 47 fixed to the standards 3, the rollers being in position to engage with the feed bars 10 and positively rotated from the shaft 27 carrying the rack actuating gears 32 through a train of gearing 48. To separate and prevent the feeding of two or more superposed blanks gauges are arranged at the blank entering sides of the rollers 45, these gauges comprising plates 49 connected to the brackets 47 for the roller carrying shaft 46 to have adjustment toward and away from the blank support to adapt the same to the feeding of blanks of different thickness. For this purpose the screws 50 for connecting the gauge plates to the brackets 47 engage in elongated openings 47' in said brackets, and the gauge plates are adjusted by headed screws 51 threaded into the brackets 47 with the heads arranged to engage in recesses in the gauge plates, the adjusting screws and gauge plates being locked in adjusted position by set screws 52. (Figures 3 and 4.)

The blanks during the feeding thereof along the blank support are retained in position therewith by pressor feet 53 pivotally carried by levers 54 and yieldingly urged in a direction toward the blank support by springs 55, and pressor bars 56 forwardly of the pressor feet, said bars being slidably carried on studs 57 mounted in brackets 58 fixed to and extending up from the blank supporting rails and overhanging the said rails, the pressor bars being normally urged toward the blank support by springs 59 coiled about the studs 57 and confined between the pressor bars and nuts 60 threaded onto the studs 57.

The blanks are fed along the blank support by the feed dogs 11 and positioned relative to cutter mechanisms (designated in a general way by A, A¹, A² and A³) for cutting a portion from each corner of the blank C, as shown at 60', Figure 42, along the lines of the scoring 9 of the blanks to arrange the blanks with opposite side flap portions 61 and opposite end flap portions 62 adapted to be bent or folded up on the scoring lines to extend substantially at right angles to the body or intermediate portion of the blanks to constitute the sides and ends of the box, as shown in Figures 43 and 44. There are two pairs of these cutter mechanisms A, A¹, and A², A³, one pair of cutter mechanisms being carried by each pair of standards 3 and 4 whereby one pair of cutter mechanisms may be adjustable with the standards toward and away from the other pair of cutter mechanisms, and one cutter mechanism, such as A and A,² adjustable with the standards 4 toward and away from the other cutter mechanisms of each pair of cutter mechanisms A¹ and A³ carried by the standards 3, whereby the said cutter mechanisms are adapted to cut the corners from blanks of variable sizes and cut portions of variable sizes from the blanks. As one of the cutter mechanisms is a duplicate of the other detailed description of one is only deemed necessary. This cutter mechanism comprises two pairs of angularly arranged shear blades, one of which is fixed and the other pair movable toward and away from the fixed blades. The fixed shear blades 63, 64 are adjustably secured by screws 65 to the top of a carrier 66 to extend in a horizontal plane substantially parallel with the top of the blank support and blank feeding bars, with the one blade 64 extending parallel with the feed bars while the other blade 63 extends at a right angle therefrom. The blade carriers 66 are bolted to the standards 3 and 4 and the latter arranged to provide a slidway 67 between the same and the blade carriers, said blade carriers also serving to support the blank supporting rails 8 therefrom. The blades 63, 64 are adapted to have adjustment to compensate for wear and sharpening, and for this purpose the perforations for the engagement of the screws 65 are elongated and the blades are adjusted by headed set screws 68 threaded into the sides of the carrier 66 with the heads engaging recesses in the blades, as clearly shown in Figure 9. The reciprocable shear blades 69 and 70 are mounted upon carriers in the form of heads 71 extending laterally from slides 72 slidably mounted in the slideways 67 arranged by the blade carriers 66 and the cutter supporting standards. This blade carrying head 71 is angularly arranged to coincide with the angular arrangement of the fixed blades 63, 64 with the bottom edges of the angular portions inclining downwardly from the corner or the juncture of said angular portions. The blades 69, 70 are secured to the carrier head by clamping plates 73 with the cutting edge of the blades in opposed relation to the cutting edges of the blades 63, 64 and inclining at an angle to coincide with the inclination of the angle portions of the blade carrying head. By the arrangement of the reciprocable cutter blades 69, 70 the corner portions are cut cleanly from the blank without leaving any rough edges To further facilitate and assure the cutting of the corners from the blanks with a clean cut the blades 69, 70 and the blade connecting plates 73 are constructed and arranged as shown at 74 with the blades suspended from adjustable pins 75 to permit the blades to have a slight lateral movement with the portion of the blades having the cutting edge yieldingly urged laterally of the blade carrying head and in a direction toward the cutting edge of the blades 63, 64 by springs 76 seated in the cutter carrying head 71 and blades to confine the springs between the two. By this arrangement the cutting edge of the blades 69 and 70 are at all times maintained in cutting relation with the cutting edge of the blades 63, 64 as the blade carrying head 71 is moved downward with the cutters in the operation of cutting.

All of the cutter blade carrying heads 71 of the cutter mechanisms A, A¹, A² and A³ are reciprocated in unison toward and away from the fixed cutter blades and alternately with the blank feeding movements of the feed bars 10 by means actuated from the shaft 24, and comprising a rack bar 77 bolted to an inwardly or off set portion of each of the blade carrying slides 72, said racks slidably engaging in guideways 78 and meshing with gears 79 keyed to parallel shafts 80 journaled in the two pairs of standards 3 and 4 and the two pairs of standards 5 and 6 whereby said gears 79 may have rotative movement with and longitudinal adjustment on said shafts. The shafts 80 are driven from a transverse shaft 81 operatively connected to the shafts 80 by beveled gears 82 on said latter shafts meshing with beveled gears 83 on the transverse shaft 81, and the shafts 80 and 81 rotated back and forth by a rack 84 meshing with a gear 85 on shaft 81, the rack 84 being reciprocated by a roller 86 carried on a stud projecting laterally from said rack engaging a cam groove 87 in a disk 88 fixed to the drive shaft 24, said cam disk being enclosed in a housing one part 89 of which is integral with the pillow block 25 and the other part 90 being arranged for the slidable supporting of the rack 84 and releasably secured to the section 89.

The reciprocable blade carrying heads are arranged to reciprocate in guards in the form of tubular housings 91 releasably connected to the standards 3, 4 in superposed relation to the fixed cutter blades 63, 64 and in spaced relation to the latter to permit of the passage of the blanks over the fixed cutter blades to be acted upon thereby, and the guards and standards being arranged with guideways to constitute a continuation of the guideways 67 for the slidable engagement of the blade head carrying slides, as clearly shown in Figure 9. The carrying levers for the pressor feet 53 are pivotally supported upon studs 92 fixed in the guards whereby the pressor feet are removable with the guards 91. It will be noted that by the arrangement of the pressor feet 53 a blank will be firmly though yieldingly held in position upon the blank support during the action of the cutter blades to cut portions from the corners of the blanks.

Means are provided to lock the blade carrying heads 71 against descending movement when the guards 91 are removed for the purpose of substituting cutter blades and thereby prevent possible injury to the operator, which means is normally maintained inoperative when the guards are in position and automatically operative when the guards are removed to lock the blade carrying heads against descending movement. This means comprises bars 93 arranged with rack teeth and mounted upon the standards 3, 4 with the rack teeth substantially flush with the wall of the guideway 67 for the head carrying slides 72 (Figures 7 and 9), pawls 94 being pivotally mounted on pins 95 in recesses in the lateral portions of the slides 72 engaging in the guideways 67, springs 96 being tensioned to urge the pawls in a direction to engage the ratchet teeth of the bars 93. The pawls 94 are so constructed and arranged that they will be maintained out of operative engagment with the ratchet bars when the guards are in cutter plate enclosing position, as shown in Figure 9. However, as the guards are removed the pawls will be automatically moved by the springs 96 to engage the ratchet teeth of the bars, and as the guards are again replaced the pawls will be automatically thrown out of engagement with the ratchet bars and maintained in such position by the guards. There are preferably two of these locking bars for each of the cutter mechanisms whereby the possibility of accidentally releasing the locking means and the blade carrying heads is practically eliminated.

After the corners have been cut from a blank and the cutter mechanisms are retracted or returned to initial positions as well as the blank feeding means, upon the next blank feeding movement of the feeding means the cut blank will be delivered from the cutter mechanism and during this blank delivery movement of the feeding means a successive blank will be simultaneously fed to the cutter mechanisms. As the blanks are delivered from the cutter mechanisms they are fed under the pressor bars 56 and during the movement of the blanks from the cutter mechanisms the opposite side flap portions 61 of the blanks are brought into engagement with flanges 97 arranged at opposite sides of the blank support, said flaps being constructed and arranged to bend or fold up said side flap portions to substantially right angles to the body or intermediate portion of the blanks, as shown in Figure 43.

During the next successive blank feeding movement of the blank feeding means the blank with the side flaps bent up is delivered between a vertically reciprocable elevator means and heads 98 arranged in superposed and spaced relation to said elevator means. The elevator means is arranged at the forward end of the blank support and normally positioned in a plane with said support, and comprises corner blocks 99 (Figures 35, 36 and 37) the opposite side blocks being connected by bars or boards 100 into an integral structure and supported by rods 101 fixed at their upper ends in each of the blocks 99, as shown at 102 in Figure 36, and said supporting rods slidably engaging in openings in brackets 103 (Figures 5 and 51) adjustably mounted upon the standards 5 and 6.

The heads 98 are connected to and carried by plungers 104 having tubular extensions 105 slidably engaging in openings in arms 106 to have vertical reciprocable movement, said arms being connected to and extending from the standards 5 and 6 (Figures 5 and 51). The head carrying plungers 104 are operatively connected to and actuated by vertical reciprocable slides 107 slidably mounted in the standards 5 and 6 by arms 108 fixed to and reciprocable with the slides 107. The slides and thereby the heads 98 are reciprocated or in unison with the corner cutters from the shafts 80 by gears 109 on said shafts meshing with racks 110 operatively connected to the slides. As the shafts 80 are rotated to and fro from the shaft 81 the slides will be reciprocated upward and downward and by the connection of the head carrying plungers 104 thereto by the arms 108 participating movement will be imparted to the heads 98. The reciprocable movements of the elevator means are in unison with the reciprocable movement of the heads 98 the downward movement being imparted thereto by the heads 98 and the upward movement by arms 111 carried by the slides 107 an extension 101' of the elevator rods slidably engaging in a perforation in said arms and the latter engaging an adjustable abutment 111' on the elevator rods. The elevator blocks are yieldingly retained against movement by a detent 103' slidably engaging in a bore in the brackets 103 transverse to the movement of the elevator block carrying rods 101 and yieldingly forced into engagement with said rods by a spring 104' coiled about a reduced portion of the detent and confined between the shoulder formed by the reduced portion of the detent and a plug 105' threaded into the end of the detent carrying bore.

With the blank delivered to the elevator means with the side flaps bent up and said flaps retained in said position by members 112 fixed to the brackets 103 during the next downward movement of the cutter blade carrying heads 71 the slides 107 are also moved downward and therewith the elevator and heads 98 the opposite end flaps 62 of the blank on the elevator engaging with bending boards 113 arranged rearwardly and forwardly of the elevator substantially in line with the scoring 9 of the opposite end flaps 62 and bending or folding said flaps as the heads 98 descend to substantially at right angles to the body or intermediate portion of the blank. The plunger heads 98 and elevator blocks 99 move downward until such movement is arrested by the engagement of the elevator with the brackets 103, as shown at 114, (Figure 17), when stray strips 115 are applied to the corners formed by the bent up flaps of the blank on the elevator.

The downwardly reciprocable movement of the slides 107 is of greater extent than the downward movement of the elevator and head carrying plungers, as well as of the cutter blade carrying heads 71, by and in accordance with the size of the slide actuating gears 109 on the shafts 80 relative to the size of the reciprocable cutter blade actuating gears on said shafts 80. During the continued independent downward movement of the slides 107 the elevator controlling arms 111 on said slides move downwardly therewith away from the abutment on the elevator supporting rods 101, and to permit of this movement of the slides without participating movement of the head carrying plungers 104 means are provided to automatically uncouple the slides from said plungers at a predetermined point in the downward movement thereof and to couple the plungers to the slides. For this purpose the plungers 104 engage in recesses in the arms 108 and are operatively connected to the arms by spring influenced detents. This detent means as shown in Figure 38 comprises a tubular member 117 slidably engaging in a tubular carrier 118 fixed in a plate 119 secured to the open side of the recess in the arms to retain the plungers in the arm recesses, and the detent 117 is yieldingly urged in a direction toward the plunger by a spring 120 confined within the detent and a cap 121 threaded into the outer end of the detent carrier 118. To lock the plungers to the slide arms 108 the plungers are arranged with recesses 122 for the engagement of the detents. It will be obvious that by the application of a force in a longitudinal direction to the plunger carrying arms to overcome the force of the springs 120, as for instance when the downward movement of the plunger heads is arrested by the engagement thereof with the elevator blocks and the latter with brackets 103, that the detent will be moved out of the plunger recesses 122 against the tension of the springs and the detents will ride along the side of the plungers. During the independent return movement of the arms with the slides the detents will ride along the plungers until they come opposite the plunger recesses 122 when the detents will automatically engage therein due to the action of the detent springs and again couple the plungers to the slide arms 108 and the plungers will participate in the movement of the slides.

To apply stay strips to the corners of the bent or folded up flaps of the blank on the elevator a series of four rolls of rotatably supported stay strip webs (one of which is shown at W Figure 51), is provided from which predetermined portions are fed, severed and applied to the corners of the bent up flaps by means operative from the elevator during the downward movement thereof and by the downward movement of the slides during the movement thereof independent of the head carrying plungers and the elevator. The stay strip web is preferably of the type having one surface gummed and said surface is moistened to apply the same. However, it is to be understood that the webs instead of having a gummed surface may be supplied with an adhesive on one surface during the feeding thereof, and that for this purpose an adhesive may be substituted for the liquid to moisten the gummed surface of the webs utilized in the present apparatus.

There are four of said stay strip web feeding mechanisms operative to feed a stay strip web for each corner of the bent up flaps, but for an understanding of the invention it is deemed sufficient to illustrate only one of said mechanisms and describe the same in detail. Each of the stay strip feeding means comprises a pair of contacting rollers 125, 126 (Figures 28 to 32 and 51) having a driving fit with bushings 127, 128 whereby the roller 126 is journaled on a stud 129 fixed in an arm 130 fixed to and extending downward from the brackets 103.

The roller carrying bushing 127 is journaled with the roller 125 on a stud 131 fixed in a lever 132 pivotally carried by the arm 130 and yieldingly urged in a direction with the roller into contact with the roller 126 by a spring 133 seated at one end in said lever and at the other end in a cupped nut 134 threaded into a fixed part of the arm 130. The roller 125 is arranged with a peripheral V-shaped groove and the periphery of the roller 126 is shaped to correspond with said V groove and engage therein, as clearly shown in Figure 28. By this arrangement of the feeding rollers the stay strip web as it is fed thereby is simultaneously creased or folded longitudinally to V shape in cross section to conform to the corners of the bent up blank flaps. The stay strip web is delivered from the feed rollers to a guide 135 carried by a block 136 at the upper end of arm 130 in line with a V-shaped perforation in said block, said block also serving as a shear cutter blade located in a plane preferably above the body portion of the blank on the elevator when the latter is in its lowered position, and the block having a V-shaped recess 136' to engage a corner portion of the elevator blocks 99 and the blank flaps bent up by the plunger heads 98. One surface of the stay strips is provided with an adhesive coating, which is on the inner surface of the strip when it is creased to V shape by the feed rollers, and to moisten this gummed surface a liquid carrying trough 137 is provided arranged for the roller 126 to engage therein, as clearly shown in Figure 29. In this arrangement as the roller 126 rotates the periphery of the roller becomes moistened and which moisture is applied to the gummed surface of the stay strip web. The trough is connected to a source of liquid supply by a tube 138 connected to nipple 139 extending from the bottom of the trough having a bore in communication with the trough.

To facilitate the creasing of the stay strip by the feeding rollers the web is longitudinally scored at a point midway between the edges of the strip. This means comprises a pair of rollers 140, 141 mounted on studs 142, 143 rotatably carried by plates 144 fixed to the opposite sides of the roller carrying lever 132 with the roller engaging between said plates. The length of said rollers and the space between the roller carrying plates is substantially the width of the stay strip web. The roller 141 is arranged with a peripheral V-shaped bead 145 and the roller 140 with a correspondingly formed peripheral groove 146 for the engagement of said bead. The plates 144 are arranged to guide the scored web to the feeding rollers 125, 126. To facilitate the starting of the stay strip web to the scoring and feeding rollers one of the scoring rollers, shown as the roller 141, is arranged with a knurled knob 143' to manually manipulate the same. The roller carrying stud 143 is mounted in the plates 144 to have movement toward and away from the roller 140 by elongating the openings in which said stud is mounted and the roller 141 is yieldingly urged in a direction toward roller 140 by springs 141', and one roller is positively driven from the other by meshing pinions shown at 140' fixed to the roller carrying studs.

The stay strip feeding rollers are positively driven in one direction by meshing pinions 147, 148 loosely mounted on the ends of the roller shafts and retained thereon by a plate 149. Clutch mechanism is provided between the pinions and rollers operative to couple the pinions to the rollers when they are rotated in one direction and to uncouple the pinions from the rollers when rotated in reverse direction. For this purpose the pinions are arranged with laterally extending hubs which extend into annular axial enlargements 150 of the feed roller carrying bushings 127, 128 with recesses 151 cut into the inner wall of said recesses with the bottom wall of said recesses arranged as a cam surface, as clearly shown in Figure 29. Rollers 152 are arranged in the recesses 151 and confined therein by the pinion hubs, springs 153 normally urging said rollers in a direction to wedge the rollers between the pinion hubs and bushing enlargements. As the gears are rotated in the direction of the arrow to impart feeding movement to the rollers the rollers 152 are moved to position to wedge the pinions to the carrier bushings, and when rotated in reverse direction the rollers 152 are moved to unwedging position uncoupling the pinions from the rollers and impart no movement to the latter.

The roller actuating pinions are rotated from the elevator during the downward movement thereof. For this purpose there is mounted in each of the elevator blocks 99 to participate in the movement of the elevator, a bar 153' carrying a rack 154 to mesh with the feed roller pinion 148 and slidably engaging in a guideway formed by the connection of the pinion retaining plate 149 with the support 137' for the liquid trough connected to the roller supporting arm 130. It will be obvious that as the racks are moved up and down a to and fro movement will be imparted to the roller pinions, and when the latter are moved in one direction they will be coupled to the feed rollers by the clutch rollers 152.

After the stay strip, web has been fed it is severed and forcibly though yieldingly applied to the corners of the bent flaps of the blank on the elevator. This means comprises a block 155 (Figures 17, 18 and 25) carried by or integral with a rocker arm 156 pivotally mounted on a stud in the bracket 103 to move on a vertical axis, the block being arranged with a longitudinal V groove 157 and a recess 157' at the apex of the walls of said groove, and the arm 156 normally positioned with the V groove in the block in line with the V perforation in the cutter block 136, and as the stay strip is delivered from the cutter block 136 it is directed to the V groove of the block 155 within laterally yieldingly movable retaining clips 158 arranged at opposite sides of the block and formed to extend slightly forward of the V groove (Figure 25). After the stay strip feeding movement the block carrying arm is moved in a direction toward the bent up flaps of the blank on the elevator and during this movement a cutter 159 carried at the bottom of the block 155 and yieldingly urged toward the cutter block 136 co-operates with the latter to sever the stay strip, and the severed portion of the stay strip is carried with the block to the bent up blank flaps, as clearly shown in Figures 18, 25 and 27. The stay strip severing and applying means is actuated by means operated from the slides during the downward movement thereof independent of the head carrying plungers 104, and comprises a cam 160 fixed to the slides engaged by a roller 161 on an arm 162 fixed to a vertical rock shaft 163 carried by a bracket 165 and urged in a direction with the roller into engagement with the cam by a spring 164 (Figure 18). A second arm 166 keyed to the shaft 163 to participate in the rocking movement thereof and have sliding movement thereon, for a purpose to be hereinafter described, has a yielding operative connection with the rocker arm 156 and consists of a headed stud 164' slidably engaging a tubular member 163' pivotally mounted in a bifurcated end 166' of arm 166 and connected as at 156' to the block carrying arm 156 with a spring 167 coiled about the stud in interposed relation to the arm 156 and tubular member 163'.

Figure 46:
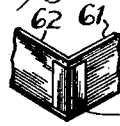
Figure 47:
Figure 48:
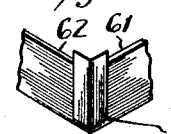
Figure 49:
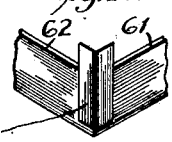

To impart downward movement to the racks 154 to impart movement to the stay strip web feeding means, and to impart variable stay strip feeding movement to the racks, the rack carriers 153' slidably engage in openings 170 in the elevator blocks 99, said rack carriers having a laterally projecting lug 171 to cooperate with adjustable stop members 172 mounted in said elevator blocks adjacent to the rack engaging opening whereby the racks are coupled to the elevator blocks during the upward movement thereof and participate in such movement of the blocks. During the downward movement of the blocks and heads 98 the ends of the rack carriers 153' engage a box blank C interposed between the elevator and plunger heads and participating in the downward movement imparted to said rack carriers thereby. However, should there be no box blank interposed between the plunger heads and elevator blocks the rack carriers will pass up through the openings in the elevator blocks and openings 173 in the plunger heads with no stay strip feeding movement imparted to the rack carriers (Figures 33 to 37). To feed variable lengths of stay strips, as for instance of a length to come within the height or of the same height as the blank flaps, as shown in Figures 46 and 47, or with variable portions extending above the top edge of the blank flaps, as shown in Figures 48 and 49, to be turned in, folded and set against the inner corners of the blank flaps, means are provided to permit the elevator and plunger heads to have movement of variable extent without participating movement of the rack carriers 153'. For this purpose the stop member is in the form of a spirally arranged shoulder 172' projecting laterally from the member 172 and extending into the opening 170, said member 172 being mounted in the elevator blocks to have limited rotative adjustment. To mount the members 172 in the elevator blocks a portion 174 of reduced diameter at one end thereof engages in an opening of reduced diameter in said blocks communicating with the openings in which the members 172 are located, and the opposite ends of said member 172 have a portion 175 of reduced diameter to engage an opening in plates 176 fixed to the elevator blocks to retain the members 172 within the block, said plates having openings in register with the openings 170 in the elevator blocks and plunger heads. It will be obvious that by adjusting the stop member 172 to a greater or less extent the elevator will have variable movement independent of and relative to the rack carriers 153', and the racks are actuated by engagement thereof with a box blank interposed between the elevator and plunger heads. The upper end of the stop block 172 is arranged with a slot 177 for the engagement of a screwdriver or the like to adjust the same, which slot may serve as a pointer to co-operate with an index or calibrations 178 (Figure 35) on the plate 176 to indicate the extent of the adjustment and the length of stay strip to be fed. When the stop block 172 is adjusted with the slot in register with the zero indice a length of stay strip will be fed to come to the top edge of the blank flaps. When the block is adjusted to the left of said zero indice a stay strip of less length will be fed, and when adjusted to the right a stay strip of greater length will be fed. To limit the rotative adjustment of the stop block 172 the block is arranged with a laterally projecting pin 179 which is adapted to abut against either one of two stop pins 180 extending downwardly from the index plate into the path of movement of the pin 179.

The carrier 153' for the actuating racks 154 for the stay strip feeding means are yieldingly retained against longitudinal movement and held against rotation by a detent 225' having a beveled end to engage the wall of a recess in said carrier 153', as shown at 226, (Figure 20), said detent being slidably mounted in a transverse opening in the bracket 103 in communication with the openings in which the rack carriers are mounted and yieldingly urged in a direction toward the rack carriers by a spring 227 coiled about a reduced portion of the detent and confined between a shoulder formed by said reduced portion and a plug 228 threaded into the end of the detent opening.

The means to turn in the extended portions of the stay strips, as shown in Figure 44, and fold and set said extended stay strip portions against the inner corner of the blank flaps, as shown in Figure 45, comprises dogs 181 in the form of plates having a bifurcated hook 182 projecting from one corner and the edge portion opposite the hook arranged with ears 183 at the corners slidably engaging in a slot or groove 184 (Figure 24) in the head plungers 104 with a pin 185 extending transversely of said slot engaging between the dog ears 183 to permit of the dogs to have a limited sliding movement in said slot and a pivotal movement in a direction toward and away from the plunger at one terminus of its movement by arranging a recess 186 in the plunger adjacent the lower end of the slot to extend below the bottom of the slot for the engagement of the dog ear opposite to the hook. The plunger heads are of a length somewhat less than the height of the blank flaps with the upper edge of the former at which the plungers are connected thereto beveled, as shown at 187.

The dogs 181 are actuated by means operative from the slides 107 during the downward movement thereof independent of the plungers 104 after the plunger heads 98 and elevator blocks 99 have reached their lowermost position, and comprises auxiliary plungers or bars 188 fixed in the recess of the arms 108 in contiguous relation to the head carrying plungers 104 (Figures 22 to 27). Each bar 188 has a slot 189 in the face thereof adjacent to its companion plunger 104 cut through the lower end of the bar. As the bar 188 moves downward with the slide 107 without participating movement of the plunger 104 it carries with it the stay strip turning in dog 181 until the forward ear 183 of the dog comes in register with the bar recess 186 at which time the dog is at the limit of its downward sliding movement relative to the plunger and engages at the outer side of the stay strip 115 (Figure 25), and the end of the bar engaging in back of the dog hook 182 will during the continued downward movement thereof swing the dog inward on the pin 185 and the forward dog ear 183 into engagement with the plunger recess 186. Simultaneously with this movement of the dog the hook engages and turns the extended stay strip portion inward, as shown in Figure 26. During this inward movement of the dog ear due to the bifurcated arrangement of the dog hook the extended portion of the stay strip will be folded on a line substantially midway between the longitudinal edges of the strip, or on a line with the scoring of the strip, as shown at 115′ (Figure 25A), the portions of the stay strip at opposite sides of said folded portion 115 being drawn taut in a flat condition over the top edge of the blank flaps at opposite sides of the corner formed by said blank flaps. In this position the turning in dog has reached the limit of its downward movement, which movement is arrested by the rear dog ear 183 engaging pin 185, and during the continued downward movement of the bar 188 the dog hook 182 will engage in the bar slot 189, the end of the bar during its continued downward movement thereof engaging the turned in portion of the stay strip and folding the portion thereof at opposite sides of the fold 115′ against the inner corner of the blank flaps, and the folded portion 115′ against a portion of the stay strip at either side thereof. As the end of the bar comes into engagement with the beveled portion 187 of the plunger head 98 an outward pressure is exerted on the bar forcibly pressing and setting the stay strip against the inner surface of the corner of the blank flaps. The bars 188 are of triangular shape in cross section for a purpose hereinafter set forth, and also have the lower end wall slightly inclining downwardly in opposite directions from the corner 188′ (Figure 25A) which is at the outside and adjacent to the bent up blank flaps. By this arrangement of the end wall of the bars the outermost and lowermost portion of the end wall of a bar will engage the turned in stay strip which not only causes the opposite lateral portions of the stay strip to fold flat against the inner surface of the blank flaps, but also causes the intermediate folded portion 115′ which is folded against one of said lateral portions of the stay strip to be subsequently engaged by the intermediate and higher end portion 188′ of the bar and fold said portion 115′ flat against one of the lateral portions of the stay strip.

As the stay strips are turned in by the dogs means mounted on the plungers 104 and frictionally movable by the bars 188 to have a limited movement on the plungers are brought into engagement with the turned in stay strips on the top edge of the blank flaps to firmly hold the stay strips against the top edge of the blank flaps during the setting of said strips against the inner corners of the flaps. This means comprises angularly shaped members of resilient sheet metal 190 to embrace the bars 188 and attached at the longitudinal edges by screws to plates 191 (Figures 17, 18, 22, 23, 24 and 25), said plates engaging in longitudinally recessed portions in opposite corners of the plungers to have a limited movement relative to the plungers. The lower end of the members 190 at the bend are arranged with bifurcated extended portions to constitute fingers 192 to engage the stay strip on the top edge of the blank flaps, the arrangement of the bifurcation permitting of the movement of the turning-in dogs during their downward movement. Each of the bars 188 has an opening 193 cut through the bottom wall of the recess 189 for the engagement of a lug 194 projecting from the same side of the dog as the hook at the opposite corner. The end wall of said opening 193 forms a shoulder to engage the dog lug 194 during the return movement of the bars to return the dogs to initial position. By the arrangement of the connection of the members 190 to the plates 191 sufficient tension is applied to said members to grip the bars with sufficient force to frictionally move said members with the bars. To form a compact arrangement the head carrying plungers 104 are of rectangular shape in cross section with a corner portion cut away, as shown at 195, and the bars 188 are of triangular shape in cross section and arranged contiguous to the cut away portion of the plungers, as clearly shown in Figures 22, 23, 24, 25 and 33.

To make boxes of variable depth the plunger heads 98 are built up of juxtaposed plates, as clearly shown in Figures 22 to 24, releasably secured together by tie rods 196, secured at one end in the bottom plate and passing through the intermediate plates with nuts threaded onto the opposite ends, and retained against lateral displacement by positioning pins 196′, the plungers being fixed to the uppermost plate. For this purpose the brackets 103 in which the elevator block supporting rods 101 are mounted and guided and which serve as stops for the downward movement of the elevator and plunger heads, and upon which the stay strip feeding, severing and applying means are mounted are also adjustable in a vertical direction upon the standards 56.

After the stay strips have been applied to the corners of the bent up flaps of the blank on the elevator the elevator with the head carrying plungers are returned to their initial upper positions by the return movement of the slides 107 and concomitantly with the retractive movement of the cutter blade carrying heads 71. As the slides 107 approach their uppermost position means is actuated to eject the box from the elevator, said ejector means comprising a pair of rods 200 pivotally supported at 201 by arms 202 extending laterally from the brackets 106 mounted upon the standard 6, said rods being bent to form cam edges to engage an annular recess 203 in the carriers 118 for the detents 117 to couple and uncouple the head carrying plungers with the slides 107, said rods being maintained in engagement with said recess in the detent carriers by springs 204 connected at one end to the ejectors and at the opposite end to the ejector supporting brackets, and said springs also being operative to impart the ejecting movement to said rods. The end portion of the ejector rods when the slides 107 are in their lowered position are in alinement with the openings 173 for the passage of the carriers for the actuating rods for the stay strip feeding means of the forward plunger heads 98, which openings are cut through the wall of said plunger heads, as clearly shown in Figure 25. As the slides 107 with the plunger heads 98 are reciprocated the ends of the ejector rods will engage in said openings 173 and as the recessed portion of the detent carriers 118 comes into engagement with the cam portion of the ejector rods the lower free end of said rods will be moved forward and eject the box from the elevator blocks 99.

To maintain the liquid in the roller engaging troughs 137 at a predetermined level a tank or reservoir 205 for a storage liquid supply is connected to one of the brackets 103 carrying the stay strip feeding, severing and applying means, said tank being constructed and arranged with an auxiliary trough 206 therein located at a level with the roller engaging troughs 137, said trough being connected in liquid communication with the roller engaging troughs by nipples 207 mounted in openings in the bottom of said auxiliary trough to which the tubes 138 connected to the nipples 139 of the troughs 137 are connected. The liquid is supplied to the trough 206 from the tank by a dipper 208 fixed to a to and fro movable shaft 209 journaled in the ends of the tank and the movement of the dippers being limited by an arm 210 fixed to the end of the shaft projecting from the tank engaging with either one of two stops 211 or 212. The shaft 209 is moved to and fro by a reciprocable rack 213 meshing with a gear 214 mounted on the end of the shaft projecting from the tank opposite to the end carrying the stop arm 210, said rack being pivotally connected with one of the shafts 80 eccentric to the axis of rotation of said shaft to be operated from said shaft, as shown at 213′, Figure 51. The tank is provided with an overflow outlet 215 to prevent filling of the tank beyond a predetermined level and the possible flooding of the trough 206 and the connected roller engaging troughs 137. The storage tank is adjustable with the carrying bracket 103 on which it is mounted which also carries one of the stay strip feeding mechanisms to permit of automatic adjustment between the actuating rack 213 and the operating gear 214 for the dipper shaft, said gear is loosely mounted on the dipper carrying shaft and is frictionally connected to the shaft to actuate the latter by means of a friction disk 222 fixed to the dipper shaft at one side of the gear and a disk 223 having a key to engage in a guideway in the dipper shaft to permit said disk to rotate with and have sliding movement on said shaft, and yieldingly urged into frictional engagement with the gear 214 at the side opposite to the disk to frictionally clamp the gear between the disks and thereby connect the gear to the shaft by a spring 224 coiled about the shaft interposed between the disk 223 and a thumbnut 225 threaded onto the end of the dipper shaft, a disk 230 of friction material being interposed between the disk 223 and gear 214.

By the arrangement of the gear 214 on the dipper shaft as the reservoir is adjusted upward and downward with its supporting bracket 103 the gear will be rotated due to its engagement with the rack 213 but as the stop arm on the dipper shaft comes into engagement with either one of the stop pins 211 or 212 below the termination of the movement of the rack the gear will slip on the dipper shaft and thereby automatically adjust itself to cause oscillatory movement to be imparted to the dipper shaft which is limited by the stops 211 and 212 during the successive reciprocations of the rack to cause the dipper to bail the liquid from the reservoir to the trough 206 therein.

To give an alarm when there is an insufficient supply of liquid in the tank a bell 216 is mounted on a bracket exterior of the tank. A lever 217 pivotally mounted at one end on the bell support carries a float 218 at the opposite end to engage in the trough 206 to position a resilient bell striker 219 carried by the lever 217 into or out of the path of movement of the dipper in the movement thereof in bailing liquid from the tank to the trough 206. When the liquid in the trough 206 falls below a predetermined level the float carrying end of the lever will be lowered accordingly, as shown in dotted lines in Figure 40, thereby positioning the end of the bell striker to be engaged by the dipper and actuate the same and ring the bell.

To permit of adjustment of one of the feed bar rack actuating gears 32 on the shaft 27 with said feed bar actuating racks as the one side of the sub-base with the one pair of cutter and stay strip mechanisms is adjusted said gear 32 and an enclosing housing 220 therefor (Figure 8) is mounted on a sleeve 221 to which the gear is keyed whereby said gear is adjusted on the shaft 27 with the meshing feed bar rack.

To adjust one of the sub-bases 1, 2 relative to the other on the base B with one column of each pair of columns 3, 4 carrying the cutter mechanism, and one column of each pair of columns 5, 6, carrying the mechanism for folding up the end flaps of a blank and the mechanisms for applying stay strips to the corners of the bent up flaps of the blank, to adapt the apparatus for making boxes of different width, a shaft 230 is rotatably mounted in one of the sub-bases, in the present instance the sub-base 1, (Figure 50), said shaft having a pair of beveled pinions 231 fixed thereon meshing with beveled gears 232 fixed to shafts 234. The shafts 234 are rotatably carried by the sub-base 1 with the opposite end threaded into lugs 235 integral with the sub-base 2, as shown in Figure 51. The shaft 230 has a hand wheel or crank 236 connected to the end projecting from one end of the sub-base 1. The sub-bases are secured to the base B by bolts 237 having T-heads engaging in correspondingly formed slideways 238 extending transversely of the base B, and are also arranged with a rib intermediate the ends to slidably engage in a transverse guideway intermediate the ends of the base, as shown at 239. To adjust the sub-bases relative to each other the T-bolts 237 for one sub-base are loosened when the shaft 230 is rotated by the connected hand wheel thereby rotating and screwing the shafts 234 into or out from the lugs 235 of sub-base 2, the mounting of the shafts 235 being arranged whereby they will not move longitudinally relative to the sub-base 1 but move said sub-base with the longitudinal movement of the shafts. It will be obvious that by loosening the T-bolts for the sub-base 2 that by the rotating of the transverse shafts 234 the sub-base 2 will be adjusted relative to the sub-base 1.

To adjust the cutter mechanisms and the stay strip applying means relative to each other to adapt the apparatus for making boxes of different sizes the cutter mechanism carrying columns 4 are adjustable on the sub-bases relative to the columns 5. For this purpose the sub-bases are arranged in the upper surface with inverted T shaped slideways 240 (Figure 51) and the columns carrying the cutter mechanisms and stay strip applying means are secured thereto by bolts 241 having T-heads engaging in said slideways, the base of the columns also being arranged with an intermediate rib to engage in a slideway in the sub-bases, as shown at 242, the bolts for the columns 4, 6 being loosened to adjust said columns. To adjust the columns 4, 6 two pairs of shafts $a$ and $b$ are provided one shaft of each pair of shafts having threaded connection with a nut fixedly carried by each of the columns 5, as shown at $c$ and $d$ (Figures 50 and 51), the one end of the shafts being connected to the cutter carrying columns 4 whereby the shafts may be rotated and the columns participate in the axial movement of the shafts, as shown at $e$ and $f$. Each of the shafts $a$ and $b$ are journaled in bearings $g$ and $h$ (Figure 50) mounted on each of the columns 6, said bearings being arranged whereby the columns 6 will participate in the longitudinal movement of said shafts. The column adjusting shafts $a, a$ and $b, b$ are rotated simultaneously to adjust the columns, and for this purpose each of the shafts $a$ and $b$ have beveled pinions $i$ and $j$ fixed to the ends thereof projecting from the columns 6 and enclosed in housings $k, l$, the shafts $a$ being operatively connected to the shafts $b$ to be driven thereby by pinions $i$ and $j$ mounted on vertical shafts $m, m$ journaled in the housings $k, l$ with the pinions $i$ and $j$ enclosed therein. To rotate the shafts $b$ and thereby the shafts $a$ through the shafts $m$ an adjusting shaft $n'$ is provided journaled in an extension of the housing $l$ and having a hand wheel or crank $o$ fixed to one end. A pair of worm $p$ fixed to said shaft $n$ mesh with a worm wheel $p'$ fixed to each of the shafts $b$, the worm $p$ at the end opposite crank $o$ being keyed to the shaft $n$ to rotate therewith and permit of longitudinal movement of the shaft relative to the worm the worms $p$ and worm wheels being enclosed in housings which may consitute a part of the housings $l$. To adjust the columns 4 and 6 relative to the columns 3 and 5 the securing nuts 241 for the former are loosened when the actuating shaft $n$ is rotated by the hand wheel $o$ thereby rotating the shafts $a$ and $b$ and moving the columns 4 and 6 toward or from the columns 3 and 5 depending upon the direction in which the shaft $n$ is rotated.

To adjust the stay strip mechanisms on the columns 5, 6 to adapt the apparatus for making boxes of different depths the brackets 103 carrying the stay strip applying mechanisms and which regulate the movement of the blank flap bending movements the elevator blocks 99 and plunger heads 98 are mounted on the columns 5 and 6 to have adjustment in a vertical direction or in an up and down direction. For this purpose each of the brackets 103 has fixed thereto a rack $r$ (Figures 17, 18, 21, 50 and 51) with which pinions $s$ on shafts $t$ mesh, each of said shafts being journaled in the columns 5 and 6 and relative to which shafts the columns 6 are axially movable, the pinions $s$ meshing with the racks on the columns 6 being keyed to the shafts to permit said pinions to rotate with the shafts and have longitudinal movement thereon as the columns 6 are adjusted relative to the columns 5. To simultaneously rotate the shafts $t$ and adjust all of the brackets 103 simultaneously a shaft $u$ is journaled in brackets carried by the columns 5 to extend transversely of the apparatus, spiral gears $v$ and $v'$ on said shafts meshing with spiral gears $t'$ on the shaft $t$, (Figure 21,) the gear $v$ being keyed to shaft $u$ whereby it may rotate with and have movement longitudinally on the shaft. To rotate the shaft $u$ a shaft $w$ journaled in one of the brackets carrying the shaft $u$ is arranged with a hand wheel $w'$, a worm $x$ on shaft $w$ meshing with a worm wheel $x'$ on shaft $u$ to rotate therewith and have longitudinal movement thereon.

The slides 107 have a flexible connection with their actuating racks 110 whereby the racks may have movement relative to the slides should a resistance greater than a predetermined force be exerted on the slides, as for instance, should a box blank become jammed between the elevator blocks 99 and the plunger heads 98, to thereby prevent the breaking of the parts, such as the stay strip applying means. This connection comprises bolts 250 (Figure 19) passing through perforations in the racks 110 and a slot in the slides 107 and threaded into plates 252 within the slides with a series of plates interposed between the plates 252 and the wall of the slides, these intermediate plates preferably consisting of a plate 252' of frictional material, such as leather, and arranged adjacent to the wall of the slides, a plate 253 of resilient material, such as rubber, adjacent to the plate 252, and a metallic plate 254 interposed between the plates of frictional and resilient material.

The edge portion of the cutters 69, 70 having the cutting edge are beveled from the back to the front or cutting edge, as shown at 69' in Figure 9, and to cause said cutters to properly co-operate with the cutter blades 63, 64 the cutting edge at the end of the cutter blades 69, 70 which is lowermost is cut away, as at 70', whereby to guide the cutters 69, 70 relative to the cutters 63, 64 as the former come into cutting relation with the latter.

To permit of the adjustment of the sub-bases relative to each other and the adjustment of the columns on the sub-bases to adapt the apparatus for the making of boxes of different sizes, bending boards 113 as well as boards 100 for connecting the opposite side blocks 99 of the elevator means, of variable length are provided to accommodate the end flap bending and elevator means to different sizes of boxes.

To indicate the position of the stay strip feeding and applying means as it is adjusted upon the columns 5, 6 so that the operator may readily and quickly ascertain the position to which said means is to be adjusted to adapt the same to boxes of different depths, the shaft $t$ has arranged thereon a dial in the form of a disk $y$ (Figure 50) with which an index in the form of a mark or line $z$ on the housing for the worm wheel co-operates.

Having thus described my invention what I claim is:

1. In apparatus for making boxes of the character specified, means to cut a portion from the corners of a blank to arrange the blank with side and end flap portions; means to feed the blank to and deliver the same from the said corner cutting means, means to bend up the opposite side flap portions as the blanks are delivered from the corner cutting means, and means to which the blanks are fed from the side flap bending means to bend up the opposite end flap portions of the blank.

2. In apparatus for making boxes of the character specified, means to simultaneously cut a portion from each corner of a blank to arrange the blank with side and end flap portions, means to feed a blank to and deliver a cut blank from the corner cutting means, means operative to bend up the opposite side flap portions of a blank as it is delivered from the corner cutting means, a box shaped holder, and plunger mechanism to press the blank into and cooperative with the holder to bend up the opposite end flap portions.

3. In box making apparatus, means to simultaneously cut a portion from each corner of a rectangular blank to form the blank with opposite end and side portions, means to feed blanks to said corner cutting means and simultaneously deliver the cut blanks from said cutting means, means to bend up the opposite side flap portions as the blanks are delivered from the cutting means, and means to which the blanks with the opposite flap portions bent up are delivered to bend up the opposite end portions and apply corner stays to the bent up end and side flap portions.

4. In apparatus for making boxes of the character specified, a fixed sheet support, means to simultaneously cut a portion from each corner of a blank to form the blank with side and end flap portions, means to feed a blank along the sheet support and position it relative to said cutting means and simultaneously deliver a cut blank along the support from the cutting means, and means to adjust said corner cutting means to accomodate the same to cut corners from blanks of variable sizes.

5. In apparatus for making boxes of the character specified, a fixed blank support, cutters simultaneously vertically reciprocable toward and away from the support to cut a portion from each corner of a blank, means to intermittently feed a blank along the support to the cutters and during the feeding of a blank to the cutter deliver a cut blank from the cutters, and means to reciprocate the cutters during the periods of rest of the feeding means.

6. In apparatus for making boxes of the character specified, a fixed blank support; cutters simultaneously vertically reciprocable toward and away from the support to cut a portion from each corner of a blank, said cutters being arranged in opposed pairs with one cutter of each pair of cutters forwardly of the other, one pair of cutters being adjustable toward and away from the other pair of cutters, and one cutter of each pair of cutters being adjustable toward and away from the other cutter; and means intermittently operative and alternately with the movement of the cutters to deliver the cut blank from the cutters and simultaneously feed a blank to the cutters.

7. In apparatus for making boxes of the character specified, a blank support; cutters simultaneously vertically reciprocable toward and away from the support to cut a portion from each corner of the blanks to arrange the blanks with end and side flap portions, said cutters being arranged in opposed and spaced pairs with one cutter of each pair of cutters in spaced relation forwardly of the other; parallelly arranged feed bars intermittently reciprocable alternately with the reciprocation of the cutters to feed a blank to and simultaneously deliver a cut blank from the cutters; means operative to bend up the side flap portions as the blank is delivered by the feed bars from the cutters; and means to which the blank with the side flaps bent up is delivered operative to bend up the end flap portions of the blank.

8. In apparatus for making boxes of the character specified, a fixed blank support; cutters simultaneously vertically reciprocable toward and away from the support to cut a portion from each corner of the blanks to arrange the blanks with opposite end and side flap portions, said cutters being arranged in opposed pairs with one cutter of each pair forwardly of the other; and means to feed a blank to and simultaneously deliver a cut blank from the cutters comprising a pair of parallelly arranged and longitudinally reciprocable bars, and blank engaging fingers carried by said bars to have movement on a horizontal axis transverse to the movement of and into the bars.

9. In apparatus for making boxes of the character specified, a fixed blank support; cutters simultaneously vertically reciprocable toward and away from the support to cut a portion from each corner of the blanks and adjustable relative to each other to adapt the cutters to cut blanks of different sizes; and means to feed a blank along the support and position the blank relative to and simultaneously deliver a blank from the cutters, comprising a pair of rack bars intermittently reciprocable alternately with the reciprocation of the cutters, blank engaging fingers reciprocable with the bars, and means to adjust said fingers relative to the bars to adapt the same to feed blanks of different sizes.

10. In apparatus for making boxes of the character specified, a fixed blank support; cutters simultaneously reciprocable toward and away from the support to cut a portion from each corner of the blanks and adjustable relative to each other to adapt the same for blanks of different sizes; and means to feed a blank along the support and position the blank relative to the cutters and simultaneously deliver a blank from the cutters, said feeding means being adjustable to adapt the same to feed blanks of different sizes.

11. In apparatus for making boxes of the character specified, a fixed blank support; cutting mechanism to simultaneously cut portions from each corner of the blanks, comprising two pairs of opposed cutters with one cutter of each pair arranged forwardly of the other, each cutter including a pair of fixed angularly arranged blades and a carrier for a pair of blades arranged in opposed relation to the fixed blades, said blade carrier being reciprocable toward and away from the fixed blades; and means intermittently operable and alternately with the reciprocation of the blade carriers to feed a blank along the support and position the blank relative to the cutters and simultaneously deliver a cut blank from the cutters.

12. In apparatus for making boxes of the character specified, a blank support; cutting mechanism to simultaneously cut a portion from each corner of the blanks; comprising two pairs of opposed cutters with one cutter of each pair arranged forwardly of the other, each cutter including a pair of fixed angularly arranged blades and a carrier for a pair of blades arranged in opposed relation to the fixed blades, said blade carrier being reciprocable toward and away from the fixed blades; a housing in which the reciprocable blade carriers are movable; and means automatically operative when said housing is removed to lock the blade carriers against movement.

13. In apparatus for making boxes of the character specified, a blank support; cutting mechanism to simultaneously cut a portion from each corner of the blanks; comprising two pairs of opposed cutters with a cutter of each pair arranged forwardly of the other, each cutter including a pair of fixed angularly arranged blades and a carrier for a pair of blades arranged in opposed relation to the fixed blades, said blade carrier being reciprocable toward and away from the fixed blades; a housing in which the reciprocable blade carriers are movable; and means automatically operative when said housing is removed to lock the blade carriers against movement, comprising fixed racks, spring influenced pawls pivotally mounted upon the blade carriers arranged to be normally maintained out of engagement with the racks when the cutter housing is in cutter enclosing position and automatically moved into engagement with the racks when the housing is removed.

14. In apparatus for making boxes of the character specified, a blank support; cutter mechanism including blades fixed relative to the support and blades reciprocable toward and away from and cooperate with the fixed blades to cut a portion from each corner of a blank positioned relative to said cutter mechanism; parallelly arranged reciprocatory bars carried by the supports within the fixed blades arranged with blank engaging fingers to feed and position a blank relative to the cutter mechanism and arranged to deliver a cut blank from the cutter mechanism as a successive blank is fed thereto; and means to reciprocate the reciprocable blades of the cutter mechanism and alternately reciprocate the feeding bars.

15. In apparatus for making boxes of the character specified, a blank support; cutter mechanism to cut a portion from each corner of a blank, said cutter mechanism including fixed blades relative to which the blank is positioned upon the support and blades mounted on carriers in opposed relation to the fixed blades and reciprocable transversely of the blank support; means to reciprocate said blade carriers, comprising racks connected to each blade carrier, a pair of parallel shafts to and fro rotatable in unison, and pinions on said shafts to mesh with the racks; and means to feed blanks along the support and position the blanks relative to the cutter mechanism and deliver the same from the cutter mechanism.

16. In apparatus for making boxes of the character specified, a blank support; cutter mechanism to cut a portion from each corner of a blank, said cutter mechanism including fixed blades relative to which the blank is positioned upon the support and blades mounted on carriers in opposed relation to the fixed blades, and reciprocable transversely of the blank support; means to reciprocate said blade carriers, comprising racks connected to each blade carrier, a pair of parallel shafts, pinions on said shafts to mesh with the racks, a shaft to rotate on an axis transverse to the axes of the parallel shafts and geared to said latter shafts, and means to rotate the transverse shaft to and fro comprising a gear on the said shaft, a reciprocable rack meshing with said gear, a rotatable disk having a cam groove in the face thereof, and a cam follower carried by the latter rack for engaging said cam groove; and means to feed the blanks and position the same relative to the cutter mechanism and arranged to deliver the cut blanks from the cutter mechanism as a successive blank is fed thereto.

17. In apparatus for making boxes of the character specified, a blank support; cutter mechanism reciprocable transversely of the blank support relative to which the blanks are positioned and operative to cut a portion from each corner of the blanks to arrange the blanks with side and end flap portions; parallel bars slidably carried by the support arranged with blank engaging and feeding fingers; means to reciprocate the bars, comprising racks connected to and parallel with the finger carrying bars, a shaft extending transversely of the racks, gears on said shaft meshing with the racks, a pinion on said shaft, a drive shaft, and a rack reciprocable from the drive shaft in mesh with the pinion; and means operative from the drive shaft to reciprocate the cutter mechanism alternately with the reciprocation of the feed finger carrying bars.

18. In apparatus for making boxes of the character specified, cutter mechanism including blades mounted on a fixed support and blades reciprocatory toward and away from the fixed blades, said blades being arranged to cut a portion from each corner of a blank positioned relative to said blades to arrange the blank with side and end flap portions; blanks supporting rails mounted upon the supports for the fixed blades to extend in parallel and spaced relation; bars carried by the rails reciprocable longitudinally thereof; blank engaging and feeding fingers carried by the bars to have movement transversely of and into the bars; presser feet yieldingly urged in a direction toward the blank support and between which feet and the bars the blanks are fed; means to reciprocate said finger carrying bars; and means to reciprocate the cutter mechanism alternately with the reciprocation of the feed finger carrying bars.

19. In apparatus for making boxes of the character specified, a pair of blank supporting rails along which the blanks are successively fed; cutter mechanism including fixed blades with the cutting edges arranged in the plane of the supporting surface of the rails and blades reciprocable toward and away from the fixed blades, said cutting mechanism being operative to cut a portion from each corner of a blank upon the support; parallel bars slidably carried by and reciprocable longitudinally of the support and carrying blank engaging and feeding fingers arranged to feed a blank along the rails and position the blank relative to the cutter mechanism and to deliver a cut blank from the cutter mechanism as a successive blank is fed thereto; pressor feet yieldingly urged in a direction toward the blank supporting rails and between which feet and the bars the blanks are fed; means to reciprocate the bars; means to direct the blank between the pressor feet and bars as the blank is fed to the cutter mechanism; and means to reciprocate the cutter mechanism alternately with the reciprocation of the feed finger carrying bars.

20. In apparatus for making boxes of the character specified, a blank support along which the blanks are successively fed; cutter mechanism relative to which the blanks are positioned on the support operable to cut a portion from each corner of the blanks; parallel bars reciprocable longitudinally of the support and carrying blank engaging and feeding fingers operative to position a blank relative to the cutter mechanism; presser feet to yieldingly engage the bars and between which feet and the bars the blanks are delivered as they are fed to the cutter mechanism; rollers engaging with the bars and co-operating therewith to direct a blank below the presser feet; and means to prevent the feeding of more than one blank of a predetermined thickness to the cutter mechanism.

21. In apparatus for making boxes of the character specified, a blank support along which the blanks are successively fed; means to intermittently and successively feed the blanks along said support; cutter mechanism relative to which the blanks are fed and positioned by the feeding means operative to cut a portion from each corner of the blanks to arrange the blanks with opposite side and end flap portions, and flanges arranged at opposite sides of the support forwardly of the cutter mechanism to engage and bend up the side flaps of the blanks as they are delivered from the cutter mechanism.

22. In apparatus for making boxes of the character specified, a blank support along which the blanks are successively fed; means to intermittently and successively feed the blanks along said support; cutter mechanism relative to which the blanks are fed and positioned by the feeding means operative to cut a portion from each corner of the blanks to arrange the blanks with opposite side and end flap portions; presser bars arranged forwardly of the cutter mechanism at opposite sides of the support and yieldingly urged in a direction toward the support and beneath which bars the blanks are fed as they are delivered from the cutter mechanism; and flanges at the outer side of said presser bars constructed and arranged to be engaged by and bend up the side flanges of the blanks as they are fed beneath the pressor bars.

23. In apparatus for making boxes of the character specified, a blank support along which the blanks are successively fed; means to successively feed the blanks along said support; cutter mechanism relative to which the blanks are positioned as they are fed along the support operative to cut a portion from each corner of the blanks to arrange the blanks with side and end flap portions; flanges arranged at opposite sides of the support forwardly of the cutter mechanism to be engaged by and bend up the side flaps of the blanks as the blanks are delivered from the cutter mechanism; and means operative upon the blanks as they are delivered from the side flap bending flanges to bend up the end flanges of the blanks.

24. In apparatus for making boxes of the character specified, a blank support; cutter mechanism to cut a portion from each corner of box blanks; means to feed the blanks to and deliver the same from the cutter mechanism; removable guards for the cutter mechanism; means to co-operate with the cutter mechanism to hold the same against operation, said means being normally maintained in position by the guards to permit the actuation of the cutter mechanism and automatically operative when the guards are removed to co-operate with and hold the cutter mechanism against movement.

25. In apparatus for making boxes of the character specified, a blank support; cutter mechanism operative to cut a portion from each corner of a blank, said cutter mechanism including a pair of blades one of which is fixed and the other reciprocable toward and away from the fixed blade; removable guards for the reciprocable blades; and means operative when the guards are removed to co-operate with the reciprocable blades to hold the same against movement.

26. In apparatus for making boxes of the character specified, a blank support along which the box blanks are fed; means to cut a portion from each corner of the blanks to arrange the blanks with side and end flap portions, means to bend up the side flap portions and the end flap portions of the blank, said flap bending means being arranged in succession with the cutter means along the support, and means to intermittently feed the blanks along the support to successively present the blanks to the means to cut the corners from the blanks and bend up the side and end flap portions.

27. In apparatus for making boxes of the character specified, a blank support along which the box blanks are fed; means to cut a portion from each corner of the blanks to arrange the blanks with side and end flap portions, means to bend up the side flap portions and the end flap portions, said flap bending means being arranged in succession with the cutting means along the support; a pair of parallel racks slidably supported at opposite sides of the support; a bar connected to each of the racks to participate in the movement thereof and carrying blank engaging and feeding fingers; and means to reciprocate said racks and bars to successively present the blanks to the means for cutting the corners therefrom and bending up the side and end flap portions.

28. In apparatus for making boxes of the character specified, a blank support along which the box blanks are fed, means to cut a portion from each corner of the blanks to arrange the blanks with side and end flap portions, means to bend up the side flap portions and the end flap portions arranged in succession with the cutting means along the support; a pair of parallel racks slidably supported at opposite sides of the support; a bar connected to each of the racks to participate in the movement thereof and carrying blank engaging and feeding fingers; means to reciprocate said racks and bars to successively present the blanks to the means for cutting the corners therefrom and bending up the side and end flap portions; and means to adjust the racks and bars longitudinally relative to each other to feed blanks of variable sizes.

29. In apparatus for making boxes of the character specified, a blank support along which the box blanks are fed; means to cut a portion from each corner of the blanks to arrange the blanks with side and end flap portions, means to bend up the side flap portions and the end flap portions arranged in succession with the cutting means along the support; a pair of parallel racks slidably supported at opposite sides of the support; a bar connected to each of the racks to participate in the movement thereof and carrying blank engaging and feeding fingers; and means to reciprocate said racks and bars to successively present the blanks to the means for cutting the corners therefrom and bending up the side and end flap portions; and means to adjust the racks and bars longitudinally relative to each other to feed blanks of variable sizes, comprising screws rotatably carried by the fingers carrying bars and having an operative connection with the racks whereby as the screws are rotated the bars will be adjusted longitudinally relative to the racks 30. In apparatus for making boxes of the character specified, a blank support along which the box blanks are fed; means to cut a portion from each corner of the blanks to arrange the blanks with side and end flap portions, means to bend up the side flap portions and the end flap portions arranged in succession with the cutter means along the support; a pair of parallel racks slidably mounted at opposite sides of the support; a tube connected to each of the racks to extend longitudinally and participate in the movement of the racks and carrying blank engaging and feeding fingers; means to adjust the finger carrying tubes longitudinally relative to the racks comprising blocks fixed in the tubes, screws rotatably mounted in said blocks fixed within the tubes and having threaded connection with blocks slidably mounted within the tubes and having an operative connection with the racks through the wall of the tubes; and means to reciprocate the racks and tubes.

31. In apparatus for making boxes of the character specified, a blank support along which the box blanks are fed; means to cut a portion from each corner of the blanks to arrange the blanks with side and end flap portions, means to bend up the side flap portions and the end flap portions arranged in succession with the cutter means along the support; a pair of racks slidably mounted at opposite side of the support in parallel relation; a tube connected to each of the racks to extend longitudinally and participate in the movement of the racks; blank engaging fingers pivotally mounted in openings in the tubes to have movement into the tubes and normally urged to a predetermined position outward from the tubes; and means to reciprocate the racks and connected tubes.

32. In apparatus for making boxes of the character specified, a blank support along which the box blanks are fed; means to cut a portion from each corner of the blanks to arrange the blanks with side and end flap portions, means to bend up the side flap portions and the end flap portions arranged in succession with the cutter means along the support; a pair of racks slidably mounted at opposite sides of the support in parallel relation; a tube of angular shape in cross section connected to each of the racks with one flat side thereof substantially flush with the surface of the blank support; blank engaging fingers mounted in openings in the upper wall of the tubes to have movement on horizontal axes and normally yieldingly urged to position with the fingers projecting above the tubes and blank supports; and means to reciprocate the racks and connected tubes.

33. In apparatus for making boxes of the character specified, a support for the box blanks; means to cut a portion from each corner of the blanks including a series of four cutter mechanisms, each cutter mechanism comprising angularly arranged fixed blades, heads reciprocable toward and away from the fixed blades, blades carried by said heads in opposed relation to and co-operate with the fixed blades to sever a portion of the corners of the blanks as the heads are moved toward the fixed blades; means to reciprocate the cutter carrying heads, one set of blades being arranged to be urged in laterally toward the cutting edge of the co-operating blades; and means to feed the blanks along and position blanks on the support relative to the cutter mechanism and deliver the cut blanks from the cutter mechanism along the support alternately with the reciprocation of the heads.

34. In apparatus for making boxes of the character specified, a support for the box blanks; means to cut a portion from each corner of the blanks including a series of four cutter mechanisms, each cutter mechanism comprising angularly arranged fixed shear blades, heads reciprocable toward and away from the fixed blades, shear blades carried by said heads in opposed relation to the fixed blades, means to yieldingly urge the portion of said blades with the cutting edge laterally in a direction toward the cutting edge of the fixed blades; means to reciprocate the blade carrying heads; and means operative with the actuation of the blade carrying heads to deliver a cut blank from the cutting mechanisms along the support and feed a blank and position the same on the support relative to the cutter mechanisms.

35. In apparatus for making boxes of the character specified, a support for the box blanks; means to cut a portion from each corner of the blanks including a series of four cutter mechanisms, each cutter mechanism comprising angularly arranged fixed blades, heads reciprocable toward and away from the fixed blades, blades carried by said heads to co-operate with the fixed blades to sever a portion of the corners of the blanks as the heads are moved toward the fixed blades; means to reciprocate the cutter carrying heads; housings supported in superposed and spaced relation to the fixed blades and in which the reciprocable blade carrying heads operate; pressor feet carried by said housings yieldingly urged into contact with the blank support to hold the blank during the cutting of the corners therefrom; and means to feed the blanks along the support to and deliver the same from the cutter mechanism.

36. In apparatus for making boxes of the character specified, the combination of the framework including a support for the box blank; means to cut a portion from each corner of the blanks including a series of four cutter mechanisms each comprising fixed blades arranged substantially in a plane with the surface of the blank support; heads slidably mounted in guideways in the framework carrying heads in opposed relation to the fixed blades; means to reciprocate the blade carrying heads toward and away from the fixed blades; housings for the reciprocable blade carriers removably mounted upon the framework in superposed and spaced relation to the fixed blades; and means arranged in the guideways for the blade carrying heads normally maintained in position to permit reciprocation of the blade carrying heads when the housings therefor are mounted in position and automatically operated when the housings are removed to hold the blade carrying heads against descending movement.

37. In apparatus for making boxes of the character specified, the combination of the framework including a support for the box blanks; means to cut a portion from each corner of the blanks including a series of four cutter mechanisms each comprising fixed blades arranged substantially in a plane with the surface of the blank support; heads slidably mounted in guideways in the framework carrying blades in opposed relation to the fixed blades; means to reciprocate the blade carrying heads toward and away from the fixed blades; housings for the reciprocable blade carriers removably mounted upon the framework in superposed and spaced relation to the fixed blades; and means arranged in the guideways for the blade carrying heads normally maintained in position to permit reciprocation of the blade carrying heads when the housings therefor are mounted in position and automatically operated when the housings are removed to hold the blade carrying heads against descending movement, comprising racks carried in the framework flush with the wall of the guideways for the blade carrying heads, pawls pivotally carried by the heads in the guideways to co-operate with the racks to hold the heads against movement, and springs to normally urge said pawls in a direction toward the racks; said pawls being maintained out of rack engaging position by the housings when in blade enclosing position.

38. In apparatus for making boxes of the character specified, two pairs of opposed cutter mechanisms, one cutter mechanism of each pair being arranged forwardly of the other cutter mechanism for cutting a portion from each corner of a blank to arrange the blank with opposite side and end flap portion; means to bend up the opposite side flap portions as the blank is delivered from the cutter mechanisms; means to bend up the end flap portions and retain said flap portions and the side flap portions in bent condition; two pairs of opposed mechanisms one mechanism of each pair arranged forwardly of the other for feeding and applying stay strips to the corners of the bent up flaps; means for simultaneously adjusting one pair of cutter mechanisms and one pair of stay mechanisms toward and away from the other cutter and stay mechanisms, and one cutter mechanism of each pair of cutter mechanisms and one stay mechanism of each pair of stay mechanisms toward and away from the other one of said pairs of mechanisms.

39. In apparatus for making boxes of the character specified, two pairs of opposed cutter mechanisms with one cutting mechanism of each pair arranged forwardly of the other for cutting a portion from each corner of a box blank to arrange the blank with opposite side and end flap portions; means to bend up the opposite side flap portions of the blank as it is delivered from the cutter mechanisms; means to bend up the opposite end flap portions and position the blank with the opposite end and side flaps in bent condition; and two pairs of opposed mechanisms one mechanism of each pair of said mechanisms arranged forwardly of the other and said mechanisms operative to feed and apply corner stay strips to the bent up flaps of the blank.

40. In apparatus for making boxes of the character specified, two pairs of opposed cutter mechanisms with one cutting mechanism of each pair arranged forwardly of the other for cutting a portion from each corner of a box blank to arrange the blank with opposite side and end flap portions; means to feed a blank to and simultaneously deliver a cut blank from the cutter mechanisms; means operative to bend up the opposite side flap portions of the blank as it is delivered from the cutter mechanisms; means to which the blank is delivered from said flap bending means operative to bend up the opposite end flaps and retain the end and side flaps in bent condition; means to actuate said cutter mechanisms and end flap bending means in unison; two pairs of opposed mechanisms with one pair of each pair of said mechanisms arranged forwardly of the other operative to feed and apply corner stay strips to the bent up flaps of the blank, said mechanisms being operative from the end flap bending means; and means to feed the blanks successively to the cutter mechanism and flap bending means.

41. In apparatus for making boxes of the character specified two pairs of opposed cutter mechanisms one cutter mechanism of each pair being arranged forwardly of the other cutter mechanism for cutting a portion from each corner of a blank to arrange the blank with opposite side and end flap portions; means operative to bend up the opposite side flap portions as the blank is delivered from the cutter mechanisms; means to which the blank is delivered with the side flaps bent up operative to bend up the end flaps and retain the end and side flaps in bent condition; two pairs of opposed mechanisms one mechanism of each pair arranged forwardly of the other for feeding and applying stay strips to the corners of the bent up flaps; means for simultaneously adjusting one pair of cutter and stay mechanisms toward and away from the other pair of cutter and stay mechanisms; and means to simultaneously adjust one of the cutter mechanisms of each pair of cutter mechanisms and one stay mechanism of each pair of stay mechanisms toward and away from the other cutter and stay mechanisms of each pair of cutter and stay mechanisms.

42. In apparatus for making boxes of the character specified, a blank support; means for cutting a portion from each corner of the blank to arrange the blank with opposite side and end flaps; means for feeding a blank to said cutting mechanism and delivering a cut blank therefrom; flanges at opposite sides of the support forwardly of the cutting mechanism constructed and arranged to bend up the opposite side flaps of the blank as the blank is delivered from the cutting mechanism; an elevator to which the blank with the side flaps bent up is delivered and arranged with means to retain said flaps in such position; reciprocable heads to co-operate with the elevator to depress the same with the interposed blank; and means operative as the elevator is depressed to bend up the opposite end flaps of the blank.

43. In apparatus for making boxes of the character specified, a blank support; means for cutting a portion from each corner of the blank to arrange the blank with opposite side and end flaps; means for feeding a blank to said cutting mechanism and delivering a cut blank therefrom; flanges at opposite sides of the support forwardly of the cutting mechanism constructed and arranged to bend up the opposite side flaps of the blank as the blank is delivered from the cutting mechanism; means to which the blank with the opposite side flaps bent up is delivered operative to bend up the opposite end flap portions; and means to actuate said latter means operative in unison with the corner cutting means.

44. In apparatus for making boxes of the character specified, a blank support; means for cutting a portion from each corner of the blank to arrange the blank with opposite side and end flaps; means for feeding a blank to said cutting mechanism and delivering a cut blank therefrom; flanges at opposite sides of the support forwardly of the cutting mechanism constructed and arranged to bend up the opposite side flaps of the blank as the blank is delivered from the cutting mechanism; means to which the blank with the opposite side flaps bent up is delivered operative to bend up the opposite end flaps; and means simultaneously operative with the end flap bending means to feed predetermined portions of stay strips, sever the fed portions of the strips and forcibly apply the same to the corners formed by the bent up flap portions of the blank.

45. In apparatus for making boxes of the character specified, a blank support; means for cutting a portion from each corner of the blank to arrange the blank with opposite side and end flaps; means for feeding a blank to said cutting mechanism and deliver a cut blank therefrom; flanges at opposite sides of the support forwardly of the cutting mechanism constructed and arranged to bend up the opposite side flaps of the blank as the blank is delivered from the cutting mechanism; means to which the blank with the opposite side flaps bent up is delivered operative to bend up the opposite end flaps; and means simultaneously operative with the end flap bending means to feed predetermined portions of stay strips with a portion of the strip extending beyond the upper edges of the flaps, sever said fed portions of the strips, forcibly apply the same at the outer side of the corners of the folded flap portions and folding the extended portions of the strips over the top edge of the flaps and against the inner sides of the corners.

46. In apparatus for making boxes of the character specified, a blank support; means for cutting a portion from each corner of the blank to arrange the blank with opposite side and end flaps; means for feeding a blank to said cutting mechanism and delivering a cut blank therefrom; flanges at opposite sides of the support forwardly of the cutting mechanism constructed and arranged to bend up the opposite side flaps of the blank as the blank is delivered from the cutting mechanism; means to which the blank with the opposite side flaps bent up is delivered operative to bend up the opposite end flaps; means to feed predetermined portions of stay strips adjacent to the corners formed by the bent up blank flaps with a portion of the strips extending beyond the upper edges of the flaps, sever said fed portions of the strips and forcibly apply the same at the outer sides of the corners of the bent up flap portions; means to tuck in the extended portions of the strips over the upper edges of the blank flaps; and means to fold and forcibly press said tucked in portions of the stay strips against the inner sides of the corners of the flaps.

47. In apparatus for making boxes of the character specified, a blank support; means for cutting a portion from each corner of the blank to arrange the blank with opposite side and end flaps; means for feeding a blank to said cutting mechanism and delivering a cut blank therefrom; flanges at opposite sides of the support forwardly of the cutting mechanism constructed and arranged to bend up the opposite side flaps of the blank as the blank is delivered from the cutting mechanism, a reciprocable elevator normally positioned in a plane with the surface of the blank support to which the blank with the side flaps bent up is delivered arranged with means to retain said flaps in such position; reciprocable heads superposed to the elevator and co-operating therewith to lower the same with an interposed blank, said heads being arranged at the corners with slidably supported carriers; means to co-operate with the head and elevator to bend up the opposite end flaps on the blank; and vertically reciprocable slides operatively connected to the head carriers.

48. In apparatus for making boxes of the character specified, a blank support; means for cutting a portion from each corner of a blank to arrange the blank with opposite side and end flaps; means for feeding a blank to said cutting mechanism and delivering a cut blank therefrom; flanges at opposite sides of the support forwardly of the cutting mechanism constructed and arranged to bend up the opposite side flaps of the blank as the blank is delivered from the cutting mechanism; a reciprocable elevator normally positioned in a plane with the surface of the blank support to which the blank with the side flaps bent up is delivered arranged with means to retain said flaps in such position; reciprocable heads superposed to the elevator to co-operate therewith to lower the same with an interposed blank, said heads being arranged at the corners with slidably supported carriers; means to co-operate with the heads and elevator to bend up the opposite end flaps of the blank; vertically reciprocable slides operatively connected to the head carriers; means operative from and during the lowering movement of the elevator to feed and guide adhesive stay strip webs adjacent to the corners of the bent up blank flaps; and means operative when the elevator is lowered to sever a portion of said stay strip webs and forcibly apply the same to the corners of the bent up flaps.

49. In apparatus for making boxes of the character specified, a blank support; means for cutting a portion from each corner of the blank to arrange the blank with opposite side and end flaps; means for feeding a blank to said cutting mechanism and delivering a cut blank therefrom; flanges at opposite sides of the support forwardly of the cutting mechanism constructed and arranged to bend up the opposite side flaps of the blank as the blank is delivered from the cutting mechanism, a reciprocable elevator normally positioned in a plane with the surface of the blank support to which the blank with the side flaps bent up is delivered arranged with means to retain said flaps in such position; reciprocable heads superposed to the elevator to co-operate therewith to lower the same with an interposed blank, said heads being arranged at the corners with slidably supported carriers; means to co-operate with the heads and elevator to bend up the opposite end flaps of the blank; vertically reciprocable slides operatively connected to the head carriers; means to feed and guide adhesive stay strip webs adjacent to the corners of the bent up blank flaps; means to actuate said stay strip feeding means operative from and during the lowering movement of the elevator; and means operative from the slides after the heads and elevator have been lowered to sever the fed portions of the stay strip webs and forcibly apply the same to the corners of the bent up blank flaps.

50. In apparatus for making boxes of the character specified, a blank support; means for cutting a portion from each corner of the blank arrange the blank with opposite side and end flaps; means for feeding a blank to said cutting mechanism and delivering a cut blank therefrom; flanges at opposite sides of the support forwardly of the cutting mechanism constructed and arranged to bend up the opposite side flaps of the blank as the blank is delivered from the cutting mechanism, a reciprocable elevator normally positioned in a plane with the surface of the blank support to which the blank with the side flaps bent up is delivered arranged with means to retain said flaps in such position; reciprocable heads superposed to the elevator to co-operate therewith to lower the same with an interposed blank, said heads being arranged at the corners with slidably supported carriers; means to co-operate with the heads and elevator to bend up the opposite end flaps on the blank; vertically reciprocable slides operatively connected to the head carriers; means to feed and guide gummed stay strip webs adjacent to the corners of the bent up blank flaps, moisten the gummed surface of said webs, and longitudinally crease the same during the feeding thereof; and means to sever the fed portions of the webs and forcibly apply the same to the corners of the bent up blank flaps.

51. In apparatus for making boxes of the character specified, a blank support; means for cutting a portion from each corner of the blank to arrange the blank with opposite side and end flaps; means for feeding a blank to said cutting mechanism and delivering a cut blank therefrom; flanges at opposite sides of the support forwardly of the cutting mechanism constructed and arranged to bend up the opposite side flaps of the blank as the blank is delivered from the cutting mechanism; a vertically reciprocable elevator normally positioned in a plane with the blank support to which the blanks with the side flaps bent up are delivered and arranged with means to retain the side flaps in said position; reciprocable heads superposed to and adapted to cooperate with the elevator to lower the latter with an interposed blank, said heads being supported adjacent the corners by slidably mounted plungers, and said heads and elevator having limited downward and upward movements; vertically reciprocable slides; means to releasably connect the plungers to the slides whereby said plungers participate in the downward movement of the slides to the limit of the downward movement of the heads and automatically release the plungers therefrom and permit the slides to continue their downward movement without participating movement of the plungers, and operative to connect the plungers to the slides at a predetermined point in the upward movement thereof; means operative from the elevator during the downward movement thereof to feed adhesive stay strip webs and guide the same adjacent to the corners of the bent up blank flaps; and means operative from the slides during their downward movement independently of the head plungers to sever the fed stay strips and forcibly apply the same to the corners of the bent up blank flaps.

52. In apparatus for making boxes of the character specified, a blank support; means for cutting a portion from each corner of the blank to arrange the blank with opposite side and end flaps; means for feeding a blank to said cutting mechanism, and delivering a cut blank therefrom; flanges at opposite sides of the support forwardly of the cutting mechanism constructed and arranged to bend up the opposite side flaps of the blank as the blank is delivered from the cutting mechanism; an elevator having limited upward and downward movements to which the blank with the side flaps bent up is delivered and arranged with means to retain said flaps in said position; reciprocable heads superposed to the elevator and adapted to lower the same with an interposed blank; means to co-operate with the elevator and heads as they are lowered to bend up the end flaps of the blank; contacting rollers operative to feed adhesive stay strip webs; guides to which the stay strips are delivered from the rollers; means operative to actuate the stay strip feeding rollers from and during the downward movement of the elevator; and means to sever the fed portions of the stay strips and forcibly apply the same to the corners of the bent up blank flaps.

53. Apparatus for making boxes in accordance with claim 52, wherein the means to actuate the strip feeding rollers comprises meshing gears loose on the shafts of the feeding rollers, clutches operative to connect the gears to the rollers when rotated in one direction and uncouple the gears therefrom when rotated in reverse direction, and racks connected to and movable with the elevator in mesh with one of said gears.

54. Apparatus for making boxes in accordance with claim 52, wherein one of the strip feeding rollers is arranged with a peripheral V groove and the other roller having the periphery formed to correspond with and engage in the V groove of the first roller to longitudinally crease the adhesive stay strip webs simultaneously with the feeding of the webs.

55. Box making apparatus in accordance with claim 52, wherein one of the stay strip feeding rollers is arranged with a peripheral V groove and the other roller has the periphery formed to correspond with and engage in said V groove to longitudinally crease the gummed stay strip webs simultaneously with the feeding thereof, and liquid carrying troughs in which one of the rollers engages and operates to apply the liquid from the troughs to moisten the gummed surface of the strips.

56. Box making apparatus in accordance with claim 52, wherein the strip feeding rollers are arranged to longitudinally crease the strip as it is fed by the rollers, and means to longitudinally score the stay strip webs during the feeding thereof and before it enters the bite of the feeding and creasing rollers.

57. In box making apparatus in accordance with claim 52, the provision of liquid carrying troughs in which one roller of each pair of stay strip feeding rollers engages and operative to apply the liquid from the trough to and moisten the gummed surface of the stay strip webs during the feeding thereof, and means to maintain the liquid at a predetermined level in the troughs.

58. In apparatus for making boxes of the character specified, a blank support; means for cutting a portion from each corner of the blank to arrange the blank with opposite side and end flaps; means for feeding a blank to said cutting mechanism and delivering a cut blank therefrom; flanges at opposite sides of the support forwardly of the cutting mechanism constructed and arranged to bend up the opposite flaps of the blank as the blank is delivered from the cutting mechanism; an elevator having limited upward and downward movements to which the blank with the side flaps bent up is delivered and arranged with means to retain said flaps in said position; reciprocable heads superposed to the elevator and adapted to lower the same with an interposed blank; means to co-operate with the elevator and heads as they are lowered to bend up the end flaps of the blank; four pairs of contacting rollers to intermittently feed adhesive stay strip webs one roller of each pair of rollers being journalled in fixed position and the other roller of each pair journalled in a movable support and yieldingly urged toward the other roller; means to operatively connect and actuate said rollers from the elevator during the downward movement thereof; and means to sever portions of the stay strips and forcibly apply the same to the corners of the bent up flaps of the blank on the elevator.

59. In box making apparatus in accordance with claim 52, the provision of liquid carrying troughs in which one roller of each pair of stay strip feeding rollers engages and operative to apply the liquid from the trough to and moisten the gummed surface of the stay strip webs during the feeding thereof, and means to maintain the liquid at a predetermined level in the troughs comprising a storage liquid reservoir having a trough therein arranged above the normal liquid level in the reservoir and at the same level as the liquid in the roller engaging troughs, said troughs being in liquid communication, and means to supply liquid from the storage reservoir to the trough therein and maintain it at a predetermined level.

60. In box making apparatus in accordance with claim 52, liquid carrying troughs in which one roller of the stay strip feeding rollers engages to apply the liquid from the trough to and moisten the gummed surface of the stay strip during the feeding thereof, means to maintain the liquid at a predetermined level in the troughs, and means to actuate an alarm when the liquid in the troughs falls below a predetermined level.

61. In box making apparatus in accordance with claim 52, liquid carrying troughs in which one roller of the stay strip feeding rollers engages to apply the liquid from the trough to and moisten the gummed surface of the stay strip during the feeding thereof, means to maintain the liquid at a predetermined level in the troughs, and means to acuate an alarm when the liquid in the troughs falls below a predetermined level, comprising a storage liquid reservoir having a trough therein arranged above normal liquid level in the reservoir and at the same level as the liquid in the roller engaging troughs, said troughs being in liquid communication; an oscillatory dipper operative to bail liquid from the reservoir to the trough therein; a bell, a float in the trough in the reservoir carrying a bell striker and operative to position the striker in the path of the dipper and to be engaged thereby when the liquid in said trough falls below a predetermined level to ring the bell.

62. In apparatus for making boxes of the character specified, a blank support; cutter mechanism including blades reciprocable toward and away from the support to cut a portion from each corner of the box blanks positioned relative to said cutter mechanism to arrange the blanks with opposite side and end flaps; means to feed the blanks to and deliver cut blanks from the cutter mechanism; means to bend up the side flaps of the blanks as they are delivered from the cutter mechanism; an up and down movable elevator; heads superposed to the elevator vertically reciprocable in a plane with the movement of the elevator and between which heads and elevator the blanks with the side flaps bent up are delivered, and movable downward with the movement of the heads and elevator with the side flaps in their bent up condition; bending boards to co-operate with the heads during the downward movement thereof to bend up the opposite end flaps of the blanks; said heads and elevator having a limited downward movement and adapted to retain the blank with the flap portions bent substantially at right angles to the body of the blank; means to actuate said heads and elevator; means operative by the head and elevator actuating means during the downward movement of the heads and elevator to feed predetermined portions of adhesive corner stay strips adjacent to the bent up flaps of the blank, to sever a portion from said strips and apply the same to the corners of the bent up flaps; and means operative by the stay strip mechanism, elevator and head operating means when they are returned to initial position to eject the boxes from the elevator.

63. In apparatus for making boxes of the character specified, means for cutting a portion from each corner of a box blank to arrange the blank with opposite side and end flap portions; means operative to bend up the opposite side flaps of the blank as the blank is delivered from the cutting means; a vertically reciprocatory elevator relative to which the blank with the bent up side flaps is positioned; means operative during the descending movement of the elevator to bend up the opposite end flaps of the blank, said elevator in its lowered position being adapted to position a blank with the side and end flaps bent up at right angles to the body of the blank and heads superposed to and reciprocable with the elevator to engage a blank upon the elevator with the bent up side flaps operative to depress the elevator and engage within the corners formed by the bent up blank flaps, and said elevator and heads having limited upward and downward movements; reciprocable slides operably connected to the head plungers to reciprocate the heads and arranged to control the reciprocating movements of the elevator; means operative during the descending movements of the heads and elevator to feed adhesive stay strips adjacent to the corners of the bent up flaps of the blank on the elevator; and means to sever portions of the fed stay strips and apply the same to the corners of the bent up flaps.

64. In apparatus for making boxes of the character specified, means for cutting a portion from each corner of a box blank to arrange the blank with opposite side and end flap portions; means operative to bend up the opposite side flaps of the blank as the blank is delivered from the cutting means; a vertically reciprocatory elevator relative to which the blank with the bent up side flaps is positioned; means operative during the descending movement of the elevator to bend up the opposite end flaps of the blank and retain the side and end flaps bent up at right angles to the body of the blank, heads superposed to and reciprocable with the elevator to engage a blank upon the elevator with the bent up flaps and operative to depress the elevator, and said elevator and heads having limited upward and downward movements; reciprocable slides arranged in parallel relation to the head plungers and adapted to have a downward movement of greater extent than the heads and elevator; means to connect the head plungers with the slides operative to automatically release the head plungers from the slides when the heads are moved to the limit of their downward movement and permit the slides to independently continue their downward movement, and to automatically couple said head plungers with the slides at a predetermined point in the return movement of the latter; means operative during the downward movement of the elevator and heads to feed adhesive stay strip webs adjacent to the corners of the bent up flaps of the blank on the elevator; and means operative by the slides during the period of their independent downward movement to sever portions from the stay strips and apply the same to the corners of the bent up flap blanks.

65. In apparatus for making boxes of the character specified, means for cutting a portion from each corner of a box blank to arrange the blank with opposite side and end flap portions; means operative to bend up the opposite side flaps of the blank as the blank is delivered from the cutting means; a vertically reciprocatory elevator relative to which the bank with the bent up side flaps is positioned; means operative during the descending movement of the elevator to bend up the opposite end flaps of the blank, said elevator in its lowered position being adapted to position a blank with the side and end flaps bent up to right angles at the body of the blank heads superposed to and reciprocable with the elevator to engage a blank upon the elevator with the bent up flaps, and said elevator and heads having limited upward and downward movements; reciprocable slides arranged in parallel relation to the head plungers and adapted to have a downward movement of greater extent than the heads and elevator; means to connect the head plungers with the slides operative to automatically release the head plungers from the slides when the heads are moved to the limit of their downward movement and permit the slides to independently continue their downward movement, and to automatically couple said head plungers with the slides at a predetermined point in the return movement of the latter; means operative during the downward movement of the elevator and heads to feed adhesive stay strip webs adjacent to the corners of the bent up flaps of the blank on the elevator; means operative by the slides during the period of their independent downward movement to sever portions from the stay strips and apply the same to the corners of the bent up flap blanks; springs to return said stay strip feeding and applying means to initial position as the slides are retracted, and said slides being operative to return the elevator and heads to and retain them in normal position; and means to reciprocate the slides simultaneously with the means to actuate the blank cutting means.

66. In apparatus for making boxes of the character specified, means for cutting a portion from each corner of a box blank to arrange the blank with opposite side and end flap portions; means operative as a blank is delivered from the cutting means to bend up the opposite side flaps of the blank; a vertically reciprocatory elevator to which the blank is advanced with the opposite side flaps bent up; means to bend up the opposite end flaps of the blank during the descending movement of the elevator heads superposed to and reciprocable with the elevator to engage a blank upon the elevator with the bent up flaps, said elevator being arranged at each corner with a downwardly extending supporting and guiding plunger, and said elevator and heads having limited upward and downward movements; reciprocable slides operably connected to the head plungers to reciprocate the heads and arranged to control the reciprocating movements of the elevator comprising arms secured to the slides to extend laterally thereof and having a sliding connection with the plungers, and spring influenced detents to connect the arms with the plungers; means operative from and during the downward movement of the elevator to feed and longitudinally crease adhesive stay strip webs; and means actuated by the movement of the slides during the period of their independent downward movement to sever portions from the stay strip webs and apply the same to the corners of the bent up blank flaps on the elevator.

67. In apparatus for making boxes of the character specified, means for cutting a portion from each corner of a box blank to arrange the blank with opposite side and end flap portions; means to which a blank is delivered from the cutting means to bend up the opposite side flaps of the blank; a vertically reciprocatory elevator relative to which the blank with the bent up side flaps is positioned; means operative by the descending movement of the elevator to bend up the opposite end flaps of the blank; heads superposed to and reciprocable with the elevator to engage a blank upon the elevator with the bent up flaps, said elevator being arranged at each corner with downwardly extending flap supporting and guiding plungers, and said elevator and heads having limited upward and downward movements; reciprocable slides arranged in parallel relation to the head plungers and adapted to have a downward movement of greater extent than the heads and elevator; means to connect the head plungers with the slides operative to automatically release the head plungers from the slides when the heads are moved to the limit of their downward movement and permit the slides to independently continue their downward movement, and to automatically couple said head plungers with the slides at a predetermined point in the return movement of the latter; contacting rollers to feed a portion of adhesive stay strip webs adjacent to the corners of the bent up blank flaps on the elevator; means to actuate said stay strip feeding rollers from and during the downward movement of the elevator; and means operative by the head actuating means to sever a portion from the stay strips and apply the same to the corners of the bent up blank flaps.

68. In apparatus for making boxes of the character specified, means for cutting a portion from each corner of a box blank to arrange the blank with opposite side and end flap portions; means to which the blank is delivered from the cutting means to bend up the opposite side flaps of the blank; a reciprocatory elevator relative to which the blank with the bent up side flaps is positioned by the feeding means; means operative to bend up the opposite end flaps of the blank during the descending movement of the elevator; heads superposed to and reciprocable with the elevator to engage a blank upon the elevator with the bent up flaps, said elevator being arranged at each corner with a downwardly extending supporting and guiding plunger, and said elevator and head having limited upward and downward movements; reciprocable slides arranged in parallel relation to the head plungers and adapted to have a downward movement of greater extent than the heads and elevator; and means to connect the head plungers with the slides operative to automatically release the plungers from the slides when the heads are moved to the limit of their downward movement and permit the slides to independently continue their downward movement, and to automatically couple said head plungers with the slides at a predetermined point in the return movement of the latter; contacting rollers to feed a portion of gummed stay strip webs adjacent to the corners of the blank flaps on the elevator, said rollers being arranged to longitudinally crease the stay strips as they are fed thereby, and one of said rollers engaging in a liquid carrying trough to moisten the gummed surface of the webs; adjustable means to actuate said stay strip feed rollers to feed portions of the web of predetermined variable lengths; and means to sever the fed portions of the stay strips and apply the same to the corners of the bent up blank flaps.

69. In apparatus for making boxes of the character specified, means for cutting a portion from each corner of a box blank to arrange the blank with opposite side and end flap portions; means to which the blank is delivered from the cutting means to bend up the opposite side flaps; a reciprocatory elevator relative to which the blank with the bent up side flaps is positioned; means to bend up the opposite end flaps during the descending movement of the elevator; heads superposed to and reciprocable with the elevator to engage a blank upon the elevator with the bent up flaps, said elevator being arranged at each corner with a downwardly extending supporting and guiding plunger, and said elevator and head having limited upward and downward movements; reciprocable slides arranged in parallel relation to the head plungers and adapted to have a downward movement of greater extent than the heads and elevator; means to connect the head plungers with the slides operative to automatically release the plungers from the slides when the heads are moved to the limit of their downward movement and permit the slides to independently continue their downward movement, and to automatically couple said head plungers with the slides at a predetermined point in the return movement of the latter; contacting rollers to feed a portion of gummed stay strip webs adjacent to the corners of the blank flaps on the elevator, said rollers being arranged to longitudinally crease the stay strips as they are fed thereby, and one of said rollers engaging in a liquid carrying trough to moisten the gummed surface of the web; gears loose on the shafts of said rollers; clutches between said gears and rollers operative to couple the gears to the rollers when the gears are moved in one direction and uncouple the gears from the rollers when moved in reverse direction; racks to mesh with one of said roller gears; means to adjustably connect said racks to the elevators to impart variable movement to the racks and corresponding movements to the rollers to feed predetermined variable lengths of the stay strip webs; and means to sever a portion from the fed stay strips and apply the same to the corners of the bent up length flaps on the elevator.

70. In apparatus for making boxes of the character specified, means for cutting a portion from each corner of the box blank to arrange the blank with opposite side and end flap portions; means to which a blank is delivered from the cutting means to bend up the opposite side flaps of the blank; a vertically reciprocatory elevator relative to which the blank with the bent up side flaps is positioned; means to bend up the opposite end flaps during the descending movement of the elevator; heads superposed to and reciprocable with the elevator to engage a blank upon the elevator with the bent up flaps, said head being arranged at each corner with a downwardly extending supporting and guiding plunger, and said elevator and heads having limited upward and downward movements; reciprocable slides arranged in parallel relation to the head plungers and adapted to have a downward movement of greater extent than the head and elevator; and means to connect the head plungers with the slides operative to automatically release the plungers from the slides when the heads are moved to the limit of their downward movement and permit the slides to independently continue their downward movement, and to automatically couple said head plungers with the slides at a predetermined point in the return movement of the latter; contacting rollers to feed a portion of gummed stay strip webs adjacent to the corners of the blank flaps on the elevator, said rollers being arranged to longitudinally crease the stay strips as they are fed thereby, and one of said rollers engaging in a liquid carrying trough to moisten the gummed surface of the webs; gears loose on the shafts of said rollers; clutches between said gears and rollers operative to couple the gears to the rollers when the gears are moved in one direction and uncouple the gears from the rollers when moved in reverse direction; racks to mesh with one of said roller gears, said racks having a sliding connection with the elevator; adjustable means to permit the elevator to have variable movement relative to the racks to impart variable movement to the racks and rollers to feed predetermined variable lengths of the stay strip webs; and means to sever the fed portions of the stay strips and apply the same to the corners of the bent up blank flaps on the elevator.

71. In apparatus for making boxes of the character specified, means for cutting a portion from each corner of a box blank to arrange the blank with opposite side and end flap portions; means to which the blank is delivered from the cutting means to bend up the opposite side flaps; a vertically reciprocatory elevator relative to which the blank with the bent up side flaps is positioned; means to bend up the opposite end flaps during the descending movement of the elevator; heads superposed to and reciprocable with the elevator to engage a blank upon the elevator with the bent up flaps, said elevator being arranged at each corner with a downwardly extending plunger, and said elevator and heads having limited upward and downward movements; reciprocable slides arranged in parallel relation to the head plungers and adapted to have a downward movement of greater extent than the heads and elevator; and means to connect the head plungers with the slides operative to automatically release the plungers from the slides when the heads are moved to the limit of their downward movement and permit the slides to independently continue their downward movement, and to automatically couple said head plungers with the slides at a predetermined point in the return movement of the latter; contacting rollers to feed a portion of gummed stay strip webs adjacent to the corners of the blank flaps on the elevator, said rollers being arranged to longitudinally crease the stay strips as they are fed thereby, and one of said rollers engaging in a liquid carrying trough to moisten the gummed surface of the webs; gears loose on the shafts of said rollers; clutches between said gears and rollers operative to couple the gears to the rollers when the gears are moved in one direction and uncouple the gears from the rollers when moved in reverse direction; racks to mesh with one of said feed roller gears; means to actuate said racks and the feed rollers operative during the descending movement of the elevator with a blank interposed between the elevator and heads to actuate said racks and permit said racks to remain idle with no stay strip feeding movement imparted thereto during the descending movement of the elevator with no blank between the elevator and heads; and means to sever the fed portion of the stay strips and apply the same to the corners of the bent up flaps of the blank on the elevator.

72. In apparatus for making boxes of the character specified, means for cutting a portion from each corner of a box blank to arrange the blank with opposite side and end flap portions; means operative to bend up the opposite side flaps of the blank as the blank is delivered from the cutting means; a vertically reciprocatory elevator relative to which the blank with the bent up flaps is positioned; means to bend up the opposite end flaps during the descending movement of the elevator; heads superposed to and reciprocable with the elevator to engage a blank upon the elevator with the bent up flaps, said elevator being arranged at each corner with a downwardly extending supporting and grinding plunger, and said elevator and heads having limited upward and downward movements; reciprocable slides arranged in parallel relation to the head plungers and adapted to have a downward movement of greater extent than the heads and elevator; means to connect the head plungers with the slides operative to automatically release the plungers from the slides when the heads are moved to the limit of their downward movement and permit the slides to independently continue their downward movement, and to automatically couple said head plungers with the slides at a predetermined point in the return movement of the latter; contacting rollers to feed a portion of gummed stay strip webs adjacent to the corners of the blank flaps on the elevator, said rollers being arranged to longitudinally crease the stay strips as they are fed thereby, and one of said rollers engaging in a liquid carrying trough to moisten the gummed surface of the web; gears loose on the shafts of said rollers; clutches between said gears and rollers operative to couple the gears to the rollers when the gears are moved in one direction and uncouple the gears from the rollers when moved in reverse direction; racks to mesh with one of said feed roller gears, said racks having sliding connection with the elevator and relative to which racks the elevator is movable during the downward movement of the elevator with no blank between the elevator and heads, and adapted to have stay strip feeding movement imparted thereto during the descending movement of the elevator and heads with an interposed blank; and means to sever and feed a portion of the stay strips and apply the same to the bent up flaps of the blank on the elevator.

73. In apparatus for making boxes of the character specified, means for cutting a portion from each corner of a box blank to arrange the blank with opposite side and end flap portions, means operative to bend up the opposite side flaps of a blank as the blank is delivered from the cutting means; a vertically reciprocatory elevator relative to which the blank with the bent up side flaps is positioned; means operative to bend up the opposite end flaps of the blank during the descending movement of the elevator; heads superposed to and reciprocable with the elevator to engage a blank upon the elevator with the bent up flaps, said elevator being arranged at each corner with a downwardly extending supporting and guiding plunger, and said elevator and heads having limited upward and downward movements; reciprocable slides arranged in parallel relation to the head plungers and adapted to have a downward movement of greater extent than the heads and elevator; and means to connect the head plungers with the slides operative to automatically release the plungers from the slides when the heads are moved to the limit of their downward movement and permit the slides to independently continue their downward movement, and to automatically couple said head plungers with the slides at a predetermined point in the return movement of the latter; contracting rollers to feed a portion of gummed stay strip webs adjacent to the corners of the blank flaps on the elevator, said rollers being arranged to longitudinally crease the stay strips as they are fed thereby, and one of said rollers engaging in a liquid carrying trough to moisten the gummed surface of the webs; gears loose on the shafts of said rollers; clutches between said gears and rollers operative to couple the gears to the rollers when the gears are moved in one direction and uncouple the gears from the rollers when moved in reverse direction; racks to mesh with one of said feed roller gears slidably mounted in openings in the elevator; means adjustably carried by the elevator to co-operate with the racks to connect the racks with the elevator at a predetermined point in the upward movement thereof and move the racks therewith; and said heads having openings in register with the rack engaging openings in the elevator for the engagement of the racks during the descending movement of the head and elevator with no blank interposed and no movement imparted to the racks, and said racks adapted to have movement imparted thereto at a predetermined point in the downward movement of the heads and elevator with a blank interposed between the elevator and head to actuate the stay strip feeding rollers; and means to sever the fed portions of the stay strip webs and apply the same to the corners of the bent up flaps of the blank on the elevator.

74. In apparatus for making boxes of the character specified, means for cutting a portion from each corner of a box blank to arrange the blank with opposite side and end flap portions; means to which a blank is delivered from the cutting means to position the blank with the side and end flaps bent up at right angles to the body of the blank including a vertically reciprocable elevator and heads superposed to and reciprocable with the elevator to engage a blank upon the elevator with the bent up flaps, said elevator being arranged at each corner with a downwardly extending plunger, and said elevator and heads having limited upward and downward movements; reciprocable slides arranged in parallel relation to the head plungers and adapted to have a downward movement of greater extent than the heads and elevator; means to connect the head plungers with the slides operative to automatically release the plungers from the slides when the heads are moved to the limit of their downward movement and permit the slides to independently continue their downward movement, and to automatically couple said head plungers with the slides at a predetermined point in the return movement of the latter; contacting rollers to feed a portion of gummed stay strip webs adjacent to the corners of the blank flaps on the elevator, said rollers being arranged to longitudinally crease the stay strips as they are fed thereby, and one of said rollers engaging in a liquid carrying trough to moisten the gummed surface of the webs; gears loose on the shafts of said rollers; clutches between said gears and rollers operative to couple the gears to the rollers when the gears are moved in one direction and uncouple the gears from the rollers when moved in reverse direction; racks to mesh with one of said feed roller gears slidably supported in openings in the elevator and having laterally extended lugs; plugs carried by the elevator to have rotative adjustment on axes parallel with the pinion engaging racks and having a spirally arranged shoulder projecting into the rack engaging openings below the rack lugs to connect the racks with the elevator at a predetermined point in the upward movement to participate in such movement; and said heads having openings in register with the rack support engaging openings in the elevator for the slidable engagement of the rack supports to permit of descending movement of the heads and elevator relative to the rack supports with no blank between the heads and elevator, and said rack supports adapted to abut against a blank interposed between the heads and elevator at a predetermined point to participate in the descending movement of the heads and elevator to impart stay strip feeding movement to the rollers; means to limit the adjustment of the rack connecting plugs in the elevator and indicate the extent of the adjustment; and means to sever the fed portions of the stay strips and apply the same to the corners of the bent up flaps of the blank on the elevator.

75. Apparatus for making boxes of the character specified in accordance with the means set forth in claim 63 in which the means to apply the stay strips to the corners of the bent up flaps of the blank on the elevator, comprises presser blocks having V-shaped grooves in one face thereof relative to which said stay strips are delivered by the strip feeding means, and said blocks being movable toward and away from the corners of the bent up flaps of the blank on the elevator.

76. Apparatus for making boxes of the character specified in accordance with claim 63 in which the stay strip is applied to the corners of the bent up flaps of the blank on the elevator by blocks having V shaped grooves in the face of and positioned with said face in relation to the grooves formed by the blank flaps, said blocks being normally positioned away from and movable toward said corners, guides for the strips in line with the V grooves in the blocks in their normal position to which the stay strips are delivered by the feeding means and directed thereby to the blocks, cutter blades carried by the blocks, and fixed cutter blades carried by the guides with which the blades carried by the blocks co-operate to sever the stay strips as said applying blocks are moved toward the corners of the bent up flaps of the blank on the elevator.

77. Apparatus for making boxes of the character specified in accordance with the structure of claim 63 in which the stay strip is applied by blocks having V grooves in the face adjacent the corners formed by the blank flaps on the elevator and movable toward and away from said corners, and lateral yielding means arranged at opposite sides of the blocks to guide the stay strips to the V groove and retain the same therein during the movement of the blocks with the stay strips to the corners of the bent up flaps of the blank on the elevator.

78. Apparatus for making boxes of the character specified in accordance with the structure as set forth in claim 63, in which the means to apply the stay strips to the corners formed by the blank flaps on the elevator comprises presser blocks, arms on which said blocks are mounted operative to move the blocks toward and away from the elevator and normally urged in a direction to position the blocks away from the elevator and moved to position to engage the flaps of the blank of the elevator by means actuated by cams carried by slides operative during the downward movement of the slides independent of the heads and elevator.

79. Apparatus for making boxes of the character specified in accordance with the structure of claim 63 in which the means to apply the stay strips to the corners formed by the blank flaps on the elevator comprises presser blocks, arms on which said blocks are mounted operative to move the blocks toward and away from the elevator, means to yieldingly urge the arms in a direction to position the blocks away from the elevator, rock shafts, arms on said shafts carrying rollers, springs to position said arms to maintain the rollers carried thereby in operative relation to the cams on the slides, and a second arm carried by said rock shafts operatively connected to the arms carrying the stay strip applying blocks.

80. In apparatus for making boxes of the character specified in accordance with the structure set forth in claim 63 in which the stay strip feeding, severing and applying means and the elevator are adjustable in a vertical direction relative to the heads co-operating with the elevator to adapt the same to the applying of stay strips to boxes of variable depths.

81. In apparatus for making boxes of the character specified in accordance with claim 63 in which the heads comprise superposed and releasably connected sections with the upper section connected to the plungers to adapt the same to the making of boxes of variable depths.

82. In apparatus for making boxes of the character specified in accordance with the structure of claim 63 in which the elevator is carried at the upper ends of rods slidably engaging in openings in brackets fixed to the framework, and arms fixed to and extending laterally from the slides engage the lower ends of said elevator carrying rods to control the up and down movement of the elevator from the slides.

83. In apparatus for making boxes of the character specified in accordance with the structure of claim 63 wherein the stay strip feeding apparatus is adapted to feed stay strips of a length to extend above the bent up flaps of the blank on the elevator, with means to turn in the extended portions of said stay strips, fold and set the same against the inner corner portions of the bent up blank flaps.

84. In apparatus for making boxes of the character specified in accordance with the construction, arrangement and operation of parts as called for in claim 64 in which the means to turn in, fold and set the extended portion of the stay strips against the inner corner portions of the bent up blank flaps comprises bars carried by the connecting means for the head plungers with the slides in contiguous relation to said plungers and movable with the slides during the continued downward movement of the slides independently of the plungers; and dogs carried in interposed relation to the plungers and bars, each dog being arranged with a laterally projecting hook to normally extend below and beyond the end of the bars to engage above the extended portions of said stay strips, said dogs being adapted to participate in the concomitant downward movement of the plungers and bars until the plungers are brought to rest and have a limited sliding movement relative to the plungers with the bars and an inward movement toward the plungers and during such movement engage and turn in the extended portions of the stay strips, said bars being adapted to fold and set the turned in stay strips against the inner side of the corners during the continued downward movement of said bars with the independent movement of the slides, and said bars adapted to return the dogs to initial position during the return movement thereof.

85. In apparatus for making boxes in accordance with the construction, arrangement and operation of parts as called for in claim 64, in which the means to turn in, fold and set in the extended portion of the stay strips against the inner corner portions of the bent up blank flaps, comprising bars carried by the connecting means for the head plungers with the slides in contiguous relation to said plungers and movable with the slides during the continued downward movement of the slides independently of the plungers, said head carrying an actuating plunger being arranged of rectangular shape in cross section with one of the corner portions cut away, and the bars arranged of triangular shape in cross section engaging the cut away portions of the plungers, and dogs carried in interposed relation to and operative by the downward movement of the bars and plungers to engage and turn in the extended end of the stay strips, and said bars being adapted to fold and set the turned in stay strips against the inner side of the corners of the blank flaps.

86. In apparatus for making boxes in accordance with the construction, arrangement and operation of parts as called for in claim 64, in which the means to turn in, fold and set the extended portion of the stay strips against the inner corner portions of the bent up blank flaps, comprises bars carried by the connecting means for the head plungers with the slides in contiguous relation to said plungers and movable with the slides during the continued downward movement of the slides independently of the plungers, said head carrying an actuating plunger being arranged of rectangular shape in cross section with one of the corner portions cut away, and the bars arranged of triangular shape in cross section and engaging the cut away portions of the plungers, dogs carried in interposed relation to and operative by the downward movement of the bars and plungers to engage and turn in the extended end of the stay strips, and said bars being adapted to fold and set the turned in stay strips against the inner side of the corners of the blank flaps; and means mounted on the plungers and bars moved by the latter to engage the turned in stay strips on the top edge of the flaps as the strips are folded and set against the inner surface of the corners of the flaps.

87. In apparatus for making boxes in accordance with the construction, arrangement and operation of parts as called for in claim 64, in which the means to turn in, fold and set the extended portion of the stay strips against the inner corner portions of the bent up blank flaps, comprises bars carried by the connecting means for the head plungers with the slides in contiguous relation to said plungers and movable with the slides during the continued downward movement of the slides independently of the plungers, said head carrying an actuating plunger being arranged of rectangular shape in cross section with one of the corner portions cut away, and the bars arranged of triangular shape in cross section engaging the cut away portions of the plungers, dogs carried in interposed relation to and operative by the downward movement of the bars and plungers to engage and turn in the extended end of the stay strips, and said bars being adapted to fold and set the turned in stay strips against the inner side of the corners of the blank flaps; resilient plates carried by the bars to be frictionally moved with the bars on the plungers, said plates having a lower end bifurcated to engage the stay strips on the edges of the blank flaps and permit of movement of the turning in dogs in the bifurcation.

88. In box making apparatus, a support for a folded box blank; means to apply a stay strip of a predetermined length adjacent to the corner of the folded blank on the support with a portion of the strip projecting beyond the edge of the blank; and a bifurcated hooked member operative to turn in the projecting portion of the stay strip over the edge of the blank and fold a portion of the strip upon itself on a line substantially midway between the lateral edges thereof for the purpose specified.

89. In box making apparatus, a support for a folded box blank; means to apply a stay strip of a predetermined length adjacent to the corner of the folded blank on the support with a portion of the strip projecting beyond the edge of the blank; and means to turn in the projecting portion of the stay strip over the edge of the blank and fold a portion of the strip upon itself on a line substantially midway between the lateral edges thereof, then fold and set the turned in portion of the stay strip against the inner surface of the box blank.

90. In box making apparatus, a support for a folded box blank; means to apply a stay strip of a predetermined length adjacent to the corner of the folded blank on the support with a portion of the strip projecting beyond the edge of the blank; a bifurcated hooked member operative to turn in the projecting portion of the stay strip over the edge of the blank and fold a portion of the strip upon itself on a line substantially midway between the lateral edges thereof; and means to fold and set the turned in portion of the stay strip against the inner surface of the box blank.

91. In box making apparatus, a support for a folded box blank; means to apply a stay strip of a predetermined length adjacent to the corner of the folded blank on the support with a portion of the strip projecting beyond the edge of the blank; a bifurcated hooked member operative to turn in the projecting portion of the stay strip over the edge of the blank and fold a portion of the strip upon itself on a line substantially midway between the lateral edges thereof; and means to fold and set the portion of the turned in stay strip at opposite sides of the folded portion thereof against the inner surface of the box blank and the folded portion of the stay strip upon a portion of the stay strip laterally thereof.

92. In a box making apparatus, a support for a folded box blank; means to apply a stay strip of a predetermined length adjacent to the corner of the folded blank on the support with a portion of the strip projecting beyond the edge of the blank; and a dog arranged with a bifurcated hook adapted to have longitudinal and lateral movement to turn in the projecting portion of the stay strip over the edge of the blank and fold a portion of the strip upon itself on a line substantially midway between the lateral edges thereof within the bifurcation of the dog hook for the purpose specified.

93. In a machine for making boxes of the character specified, a blank support, and cutters simultaneously vertically reciprocable toward and away from the support to cut a portion from each corner of a blank, said cutters being arranged in opposed pairs with one cutter of each pair forwardly of the other, one pair of cutters being adjustable toward and away from the other pair of cutters while the latter are kept bodily stationary, and one cutter of each pair of cutters being adjustable toward and away from the other cutter while the latter is kept bodily stationary.

94. In a machine for making boxes of the character specified, a plurality of reciprocable cutters located at opposite sides of a blank, a housing in which said cutters are movable, and means automatically operative when said housing is removed to lock said cutters against movement.

95. In an apparatus for making boxes of the character specified, a blank support, means to intermittently and successively feed the blanks along said support, a cutter mechanism relative to which the blanks are fed and positioned by the feeding means operative to cut a portion from each corner of the blanks to arrange the blanks with opposite side and end flap portions, and flanges arranged adjacent said support forwardly of the cutter mechanism to engage and bend up the side flaps of the blanks as they are delivered from the cutter mechanism.

96. In a machine for making boxes of the character specified, a blank support, a cutter mechanism to cut a portion from each corner of the box blanks, a removable guard mechanism for the cutter mechanism, and means adapted to co-operate with the cutter mechanism to hold the same against operation, said last-mentioned means being normally maintained in position by said guard mechanism to permit the actuation of the cutter mechanism and automatically operative when said guard mechanism is removed.

97. In a machine for making boxes of the character specified; a plurality of reciprocable cutters for cutting a portion from each corner of a blank, a removable guard mechanism for said cutters, and means operative when said guard mechanism is removed to co-operate with said cutters to hold the same against movement.

98. In a machine for making boxes of the character specified, two pairs of opposed cutter mechanisms, one cutter mechanism of each pair being arranged forwardly of the other cutter mechanism for cutting a portion from each corner of a blank to arrange the blank with opposite side and end flap portions, means for bending up the opposite end and side flap portions of the blank, two pairs of opposed mechanisms, one mechanism of each pair arranged forwardly of the other, for feeding and applying stay strips to the corners of the bent up flaps, and means for simultaneously adjusting one pair of cutter mechanisms and one pair of stay mechanisms toward and away from the other pair of mechanisms, and one cutter mechanism of each pair of cutter mechanisms and one stay mechanism of each pair of stay mechanisms toward and away from the other one of said pairs of mechanisms.

99. In a machine for making boxes of the character specified, a cutter mechanism for cutting a portion from each corner of a box blank to arrange the blank with opposite side and end flap portions, means to bend up the opposite end and side flap portions of the blank, means to feed and apply corner stay strips to the bent up flaps of the blank, and means for causing a cooperation between said cutting means, bending means and corner stay strip feeding and applying means.

100. In a machine for making boxes of the character specified, a blank support, means for cutting a portion from each corner of the blank to arrange the blank with opposite side and end flaps, means for feeding a blank on said support to said cutting mechanism and delivering a cut blank therefrom, means for bending up the opposite side flaps and end flaps of the blank after the blank is moved along said support from the cutting means, and means for feeding predetermined portions of stay strips, sever the said portions of the strips and apply the same to the corners formed by the bent up flap portions of the blank.

101. In a machine for making boxes of the character specified, stay strip applying means, stay strip feeding means, and means for rendering said feeding means inoperative in the absence of the work to which said stay strips are to be applied.

Signed at New York city, in the county of New York and State of New York, this 10th day of September, 1923.

ROBERT G. CLARK.